United States Patent [19]
Popat

[11] Patent Number: 5,663,621
[45] Date of Patent: Sep. 2, 1997

[54] AUTONOMOUS, LOW-COST, AUTOMATIC WINDOW COVERING SYSTEM FOR DAYLIGHTING APPLICATIONS

[76] Inventor: Pradeep P. Popat, 1515 S. Jefferson Davis Hwy., Apt. 1321, Arlington, Va. 22202

[21] Appl. No.: 590,766

[22] Filed: Jan. 24, 1996

[51] Int. Cl.$^6$ .................................................... G05B 5/00
[52] U.S. Cl. .......................... 318/480; 318/648; 160/5; 160/166.1; 250/203.4
[58] Field of Search .................. 318/254, 138, 318/439, 480, 648; 388/933; 160/5, 166.1, 900, 1; 49/25; 250/203.4

[56] References Cited

U.S. PATENT DOCUMENTS

| | | | |
|---|---|---|---|
| 3,294,152 | 12/1966 | Kuijvenhoven | 160/5 |
| 3,646,985 | 3/1972 | Klann | 160/168 |
| 4,396,831 | 8/1983 | Yamada | 250/201 |
| 4,622,470 | 11/1986 | Makino | 250/203 R |
| 4,742,813 | 5/1988 | Riehl | 126/425 |
| 4,769,531 | 9/1988 | Malek | 250/203 R |
| 4,841,672 | 6/1989 | Nebhuth | 49/25 |
| 4,856,574 | 8/1989 | Minami et al. | 160/166.1 X |
| 5,142,133 | 8/1992 | Kern | 250/203.4 |
| 5,164,856 | 11/1992 | Zhang et al. | 160/166.1 X |
| 5,237,169 | 8/1993 | Grehant | 250/214 AL |

OTHER PUBLICATIONS

Lee, E. S., S. E. Selkowitz, F. M. Rubinstein, J. H. Klems, L. O. Beltran, D. L. DiBartolomeo, and R. Sullivan, "Developing Integrated Envelope and Lighting Systems for Commercial Buildings", LBL Report No. 35412, Mar. 1994, Lawrence Berkeley Laboratory, Berkeley, CA.

Lee, E. S., S. E. Selkowitz, F. M. Rubinstein, J. H. Klems, L. O. Beltran, and D. L. DiBartolomeo, "A Comprehensive Approach to Integrated Envelope and Lighting Systems for New Commercial Buildings", LBL Report No. 35732, May 1994, Lawrence Berkeley Laboratory, Berkeley, CA.

"These Shades Know How To Keep Cool", *Popular Science*, vol. 247, No. 4, Oct. 1995, p. 55.

Advertisement for Omni Vision solar tracker manufactured by OmniVision, 13689 Mono Way, Sonora, CA, 95370; advertisement appearing in Solar Today, vol. 10, No. 1, Jan./Feb. 1996, p. 42.

Advertisement for "Sky Wizard" system, sold by Orion Telescope Center, P.O. Box 1815, Santa Cruz, CA 95061-1815, advertisement appearing in Orion Telescope Center catalog No. 961, Jan.-Apr. 1996, p. 86.

*Primary Examiner*—Karen Masih

[57] ABSTRACT

A system for the automatic regulation of daylight admitted into a room, specifically intended for daylighting applications. A preferred embodiment, system 10, consisting of a conventional control unit 11, a conventional exterior brightness sensor 12, and a conventional electronically controlled window covering 13, operates to block direct solar radiation while admitting substantial diffuse illumination. Control unit 11, brightness sensor 12, and window covering 13 are interconnected in a known manner to enable control unit 11 to register the brightness of the external illumination, and to actuate window covering 13. Control unit 11 consists of a conventional microcontroller 14, a conventional real-time clock/calendar 15, and a conventional Non-Volatile Memory (NVM) 16. Microcontroller 14, clock/calendar 15, and NVM 16 are interconnected in a known manner to enable microcontroller 14 to register the output of clock/calendar 15, and to exchange data with NVM 16. NVM 16 holds pre-stored data which defines a desired setting of window covering 13 as a function of the time of the day and the day of the year, for the prevailing latitude, longitude, and window azimuth orientation. In the preferred embodiment, this desired setting is one which will block the admission of incident direct solar radiation, while still admitting substantial diffuse illumination. Microcontroller 14 periodically registers the exterior brightness as measured by sensor 12, registers the data stored in NVM 16, estimates a desired setting of window covering 14 on the basis of these data, and actuates window covering 13 to the desired setting.

15 Claims, 9 Drawing Sheets

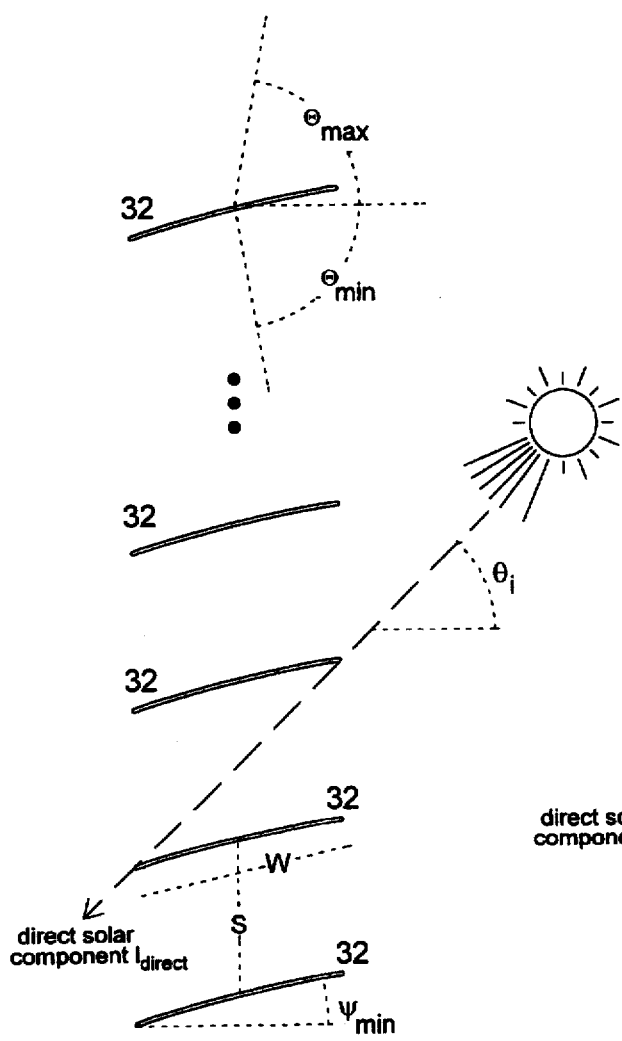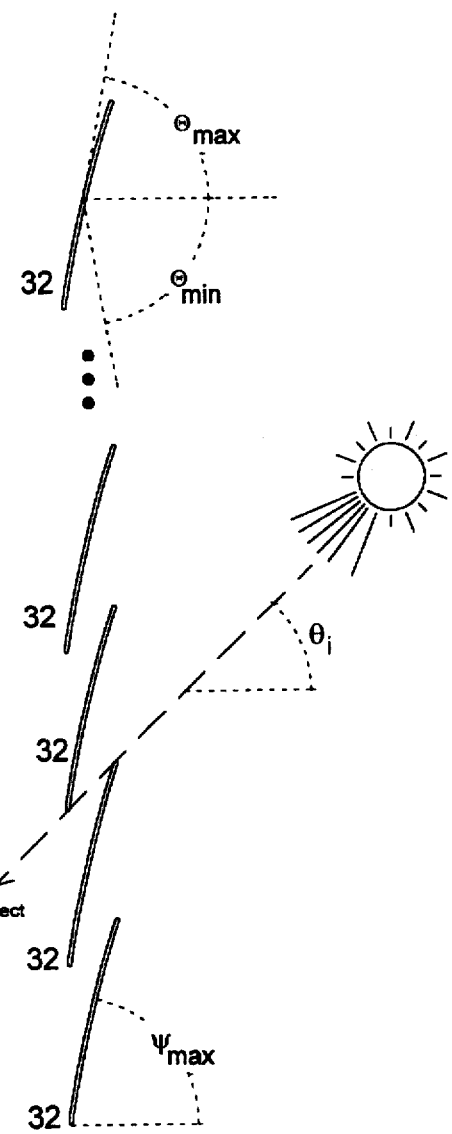
FIG. 5BFIG. 5C

5,663,621

AUTONOMOUS, LOW-COST, AUTOMATIC WINDOW COVERING SYSTEM FOR DAYLIGHTING APPLICATIONS

BACKGROUND

Cross-References to Related Applications

This invention is related and complementary to the invention of my co-pending application, Ser. No. 08/505,845, filed 1995 Jul. 24, and also to the invention of a second application, entitled "Dual Mode Automatic Window Covering System Responsive To AC-Induced Flicker In Ambient Illumination", submitted 1995 Dec. 5 (Ser. No. not yet assigned).

FIELD OF THE INVENTION

This invention relates to automatic window coverings, specifically to an automatic window covering system capable of automatically regulating the illumination admitted by a window in order to reduce the need for artificial illumination.

DISCUSSION OF PRIOR ART

AUTOMATIC WINDOW COVERINGS FOR DAYLIGHTING APPLICATIONS

The potential of automatic window coverings to save energy in commercial office buildings has long been recognized. The use of automatic window coverings for daylighting (i.e., using natural illumination to reduce the need for artificial illumination) is of particular interest, since electric lighting typically represents a large fraction of the energy consumed in commercial office operations. Accordingly, several automatic window covering systems have been developed for daylighting applications. These known systems can be grouped into two categories: autonomous systems, which operate independently from the electric lighting equipment, and integrated systems, which operate in a coordinated manner with the electric lighting equipment. Known autonomous systems can be further sub-divided into two subcategories: brightness-regulating systems, which regulate only the brightness of the interior illumination, and glare-blocking systems, which operate automatically to block the admission of direct solar radiation, which is known to be a primary cause of glare.

No conventional autonomous system is incapable of simultaneously regulating brightness and blocking glare. However, integrated systems are known which are capable of both brightness-regulating and glare-blocking operation.

Each of these types of prior-art system suffers from serious limitations; hence, they have not come into widespread use.

Autonomous Systems

Autonomous systems operate independently of the electric lighting equipment. They include means for varying the illumination transmission characteristics of a host window, which means is automatically adjusted to maintain certain predetermined illumination characteristics (as sensed by at least one sensor). The variable illumination transmission means can be a mechanically adjustable shading device (such as a venetian blind, shutter, pleated shade, roller shade, or curtain) or an electronic device (such as a liquid-crystal or electrochromic panel), while the sensor is typically a photoelectric device. Autonomous systems can be grouped into two categories: brightness-regulating systems and glare-blocking systems.

SUTONOMOUS BRIGHTNESS-REGULATING SYSTEMS

Brightness-regulating systems adjust the variable illumination transmission means to maintain a constant level of brightness, as sensed by a sensor mounted on the indoor-side of the window covering. Examples of known brightness-regulating systems are described in the following paragraphs.

System of Kuijvenhoven

U.S. Pat. No. 3,294,152 to Kuijvenhoven (1966) shows a system in which a roller-type window screen is automatically adjusted to maintain a constant level of interior brightness, as sensed by an interior-facing photoelectric cell. Kuijvenhoven also shows the use of a rotatable prism to adjust the directivity of the photoelectric cell, thereby enabling the cell to respond to brightness from a given surface or direction within the room. This enables the cell to be located close to the window while still sensing the brightness at an interior location (e.g., at the surface of a desk).

System of Klann

U.S. Pat. No. 3,646,985 to Klann (1972) shows a system in which the louver tilt angle of a venetian blind is automatically adjusted to maintain a constant level of interior brightness, as sensed by a photoelectric cell. Klann does not specify if the photoelectric cell faces the interior or the exterior of the room.

System of Yamada

U.S. Pat. No. 4,396,831 to Yamada (1983) shows a system in which the louver tilt angle of a shutter-type window covering is automatically adjusted to maintain a constant level of brightness, as sensed by an exterior-facing photoelectric sensor mounted on the interior side of the window covering. Since the photoelectric sensor faces outward, Yamada's system regulates only the amount of light passing through the shutter, and not the total interior brightness. Yamada's system also includes the capability to automatically close the shutters when the outside brightness, as sensed by a second photosensor mounted on the exterior side of the shutter, falls below a predetermined threshold (e.g., at night).

System of Makino

U.S. Pat. No. 4,622,470 to Makino (1986) shows a system which incorporates, and improves upon, Yamada's system. As is known in the art, tilting of the louvers of a louver-type window covering (such as a shutter or venetian blind) in a particular direction can either increase or decrease the amount of transmitted light, depending on the initial louver position relative to the angle of incidence of the incident radiation. This gives rise to an ambiguity which can prevent proper operation of brightness-regulating, louver-type systems (such as those shown by Klann and Yamada).

Makino's system avoids this ambiguity by including a sun-tracking sensor which is attached to—and moves with— one of the louvers. The output of this sun-tracking sensor is combined with the output of the brightness sensor to provide an error signal for a servo-control loop which automatically adjusts the louver tilt. The output of the sun-tracking sensor tends to bias the louvers parallel to the incident rays (thus maximizing the brightness of the admitted illumination), while the output of the brightness sensor tends to displace the louver tilt angle away from the parallel orientation. The result is unambiguous operation which provides closed-loop control of the amount of light transmitted by the window covering.

Disadvantages of Prior-Art Brightness-Regulating Systems

Many other such systems are known. These systems all include at least one interior-mounted photosensor, a control apparatus, and an electronically controlled shading device or window covering. The control apparatus constantly adjusts the shading device to maintain a constant level of brightness, as sensed by the photosensor. However, these systems suffer from two significant disadvantages.

First, the photosensor senses only brightness, not glare. As is known in the art, glare—which can be loosely defined as illumination which is uncomfortable or which decreases working efficiency—is not always correlated with brightness. Hence, these brightness-regulating systems have no express capability to prevent glare. For example, they cannot selectively block direct solar radiation (which is recognized as a primary cause of glare). This is a major disadvantage, since the avoidance of glare is a critical factor in maintaining a comfortable working environment.

Second, the only capability to control room brightness offered by these brightness-regulating systems is the capability to vary the amount of daylight admitted through the shading device. Unfortunately, this means of brightness regulation is disadvantageous in two circumstances:

when insufficient daylight is available (e.g., at dusk or in bad weather), such a system would be incapable of maintaining the desired brightness unless an automatic, adaptive electric lighting system were also present; however, when considerable daylight is available (e.g., on a sunny day), such a system would automatically close the blinds to admit relatively little daylight, drastically reducing the energy-saving potential of an adaptive electric lighting system (if present).

Partially as a result of these disadvantages, Autonomous brightness-regulating systems have not come into widespread use.

AUTONOMOUS GLARE-BLOCKING SYSTEMS

As is known in the art, direct solar radiation is a primary source of glare. It is also established that certain window covering are capable of blocking direct solar radiation, while still admitting diffuse daylight. Two types of window coverings are generally used for this purpose: the conventional venetian blind (which consists of an array of louvers fabricated from opaque material), and the light lens (which consists of an array of louvers fabricated from refractive material). In a light lens, the exterior-facing surfaces of the louvers are flat, while the interior-facing louver surfaces include ridges (running parallel to the length of the louvers) having a prismatic cross-section. These ridges enable the louvers to either refract or completely reflect incident daylight, depending on the angle between the louver surface and the impinging radiation.

As is known in the art, a venetian blind or light lens will prevent the passage of direct solar radiation if the louver tilt is adjusted to maintain a predetermined, minimum angle between the direct solar path and the chord (i.e., short dimension) of the louvers. Several systems have been developed which are capable of automatically operating in this manner.

System of Riehl

U.S. Pat. No. 4,742,813 to Riehl (1988) shows a system in which a sub-tracking sensor comprising a pair of photosensors is attached to, and moves with, the flat exterior surface of one of the louvers of a light lens. The photosensors are mounted in such a manner that their active surfaces are coplanar and parallel to the surface of the louver. The photosensors are shaded in such a manner that the illuminated areas of the active surfaces (and hence the outputs of the photosensors) are equal only when the incident solar radiation is perpendicular to a line connecting the photosensors. Thus, the difference between the photosensor outputs is dependent on the deviation of the solar incidence angle from the normal, with respect to the louver surface.

However, as is known in the art, a shaded sun-tracking sensor of this type provides a useful output only for incident radiation which is within a very small angular displacement (e.g., 5 degrees) from the normal. This is ostensibly not a problem in Riehl's system, since the photosensor outputs provide a servo error signal which causes the system to automatically tilt the louvers to maintain a substantially ninety-degree angle between the louver surfaces and the incident solar radiation. This orientation causes the incident radiation to be retroreflected from the prismatic ridges, preventing the admission of direct solar radiation into the room.

System of Nebhuth

U.S. Pat. No. 4,841,672 to Nebhuth (1989) shows a system which is similar to Riehl's system, which is also used in conjunction with a light lens, and which has the same object. However, in Nebhuth's system, the photosensors are unshaded, and—instead of being located on the exterior-facing side of the louver—are placed on opposing cathetal legs of one of the prismatic ridges on the interior-facing side of the louver. Like the photosensors of Riehl's system, those of Nebhuth's system provide output signals of equal magnitude only when the exterior surface of the louver is perpendicular to the incident solar radiation. However, unlike Riehl's system, Nebuth's photosensors provide a useful differential output signal over a relatively wide angular range of solar incidence. This provides two advantages over the system of Riehl.

First, it enables a "dead band" to be designed into the servo response characteristic. This allows the motor of Nebhuth's system to operate relatively infrequently, and only when the angle between the louver surfaces and the incident radiation exceeds a predetermined, relatively large threshold—thereby reducing wear and power consumption.

Second, it enables Nebhuth's system to maintain an arbitrary, variable angle between the louver surfaces and the incident radiation (instead of the fixed angle, nominally ninety degrees, of Riehl's system). Although Nebhuth does not describe the benefits of such a capability in detail, it will be recognized by those skilled in the art that such a system is potentially capable of adjusting the amount of admitted daylight while simultaneously blocking glare. This potential advantage is subsequently discussed in more detail.

System of Kern

U.S. Pat. No. 5,142,133 to Kern (1992) shows a system capable of automatically maintaining a constant, predetermined angle between incident solar radiation and the surface of the louvers of a venetian blind. Like Riehl's system, Kern's system uses a sun-tracking sensor which is attached to, and moves with, the exterior surface of one of the louvers. However, unlike Riehl's system, Kern's system does not use shading of the photosensors to provide a differential sun-tracking signal; instead, Kern's sun-tracking sensor consists of two conventional photodiodes mounted so that there is an angular displacement between their elevation response patterns. This angular displacement causes the outputs of the photodiodes to differ when the incident solar radiation is not perpendicular to a line connecting the photodiodes. A control unit registers the difference between the photodiode outputs, and operates a motor to tilt the blind louvers to maintain an equilibrium between them.

Kern's system also includes an externally-mounted background-brightness sensor, which comprises three photodiodes oriented in different directions to sense the brightness in an outward-facing 180-degree field-of-view. The output of this background-brightness sensor is also registered by the control unit, which operates a second motor to raise the blind louvers when the brightness is below a predetermined threshold, and to lower the louvers when the brightness is above a predetermined threshold.

Disadvantages of Prior-Art Autonomous Glare-Blocking Systems

The aforementioned autonomous glare-blocking systems suffer from two serious disadvantages.

First, in order to limit cost and complexity, these systems employ simple sun-tracking sensors comprising dual photodetectors. As is known in the art, such sun-tracking sensors provide a useful output over only a narrow range of solar incidence angles. The aforementioned systems solve this problem by attaching the sun-tracking sensor to one of the louvers of a louver-type window covering, and tilting the louvers—via closed-loop servo control—to maintain an approximately fixed angle of solar incidence with respect to the sensor. However, this approach is disadvantageous because it requires a modification to the design of the host venetian blind or light lens. This modification includes attachment of the photosensors, as well as installation of wires between the photosensors and the control apparatus. These wires must be capable of withstanding repeated flexing while remaining visually unobtrusive, which increases the difficulty of the installation. As a result, these systems cannot practically be retrofitted to existing window coverings.

Second, in conventional louver-type window coverings, there is generally a wide range of louver tilt angles which will block direct solar radiation; however, the amount of diffuse daylight which is admitted by the window covering will vary significantly over this range. Thus, conventional louver-type window coverings can be used to both block direct solar radiation and still allow substantial adjustment of the brightness of the admitted illumination. However, due to the above-described limitations of the sun-tracking sensor, the aforementioned systems—with the exception of the system of Nebhuth—can maintain only a substantially fixed angle between the surface of the louvers and the incident solar radiation. While this ensures that direct solar radiation will be blocked, it also prevents independent adjustment of the amount, or brightness, of the transmitted light. This could be a serious disadvantage in certain applications.

Nebhuth's system is capable of maintaining a variable angle between the surface of the louvers and the incident solar radiation. Thus, with suitable modifications, it is potentially capable of both glare-blocking and brightness-regulating functions. However, it can be used only with light lens-type window coverings, which are not widely used in the United States. In particular, Nebhuth's system is incompatible with venetian blinds, which dominate current usage in commercial office buildings in the United States.

It should be noted that—in principle—the aforementioned brightness-regnlating venetian blind system of Makino could be modified to block direct solar radiation, while simultaneously providing some degree of adjustment of the amount of diffuse daylight admitted into the room. This could be done by rotating the sensor shown by Makino by ninety degrees with respect to the long axis of the host louver (thus providing a sensor orientation similar to that shown by Kern et al), and inverting the polarity of the brightness sensor output. The output of the sun-tracking sensor would then tend to bias the louvers toward a position which completely blocks the incident direct solar radiation, while a decreasing output of the brightness sensor would cause the tilt angle to deviate from this orientation, admitting more light into the room.

However, it will be recognized by those skilled in the art that the resulting range of brightness adjustment would be very small, since the simple sun-tracking sensor used in Makino's system is incapable of operating over a wide angular range of incident solar radiation. In addition, the system would be incapable of effectively regulating the admitted brightness in the absence of direct solar radiation (i.e., when only diffuse daylight is incident on the window), since the signal provided by the sun-tracking sensor would be meaningless under such conditions. Moreover, like Klann's system, such a system would require disadvantageous modifications to the design of the host blind.

Integrated Systems

Integrated systems couple automatic window coverings with automatic, continuously-dimming electric lighting systems. In principle, these systems are capable of maintaining a comfortable work environment at minimum energy cost.

BRIGHTNESS-REGULATING SYSTEMS

Early integrated systems were capable of only brightness-regulating operation. An example of a modem implementation of a brightness-regulating integrated system is shown in U.S. Pat. No. 5,237,169 to Grehant (1993). Grehant shows that, by taking into account the reaction times of the various elements and the thermal response of the room, the operation of window coverings and lighting systems can be optimally sequenced to maintain a desired light level with minimum energy consumption.

However, like the previously-described autonomous brightness-regulating systems, the integrated brightness-regulating systems do not address the problem of preventing glare caused by the admission of direct solar radiation. As previously stated, this is a major disadvantage, since the avoidance of glare is a critical factor in maintaining a comfortable working environment.

LBL SYSTEM

More recently, integrated systems have been developed which are also capable of glare-blocking operation.

Such systems have been under development, for example, at the Energy and Environment Division of Lawrence Berkeley Laboratory (LBL), Berkeley, Calif. LBL researchers have recently developed and tested one such system (Lee, E. S., S. E. Selkowitz, F. M. Rubinstein, J. H. Klems, L. O. Beltran, D. L. DiBartolomeo, and R. Sullivan, "Developing Integrated Envelope and Lighting Systems for Commercial Buildings", LBL Report No. 35412, March 1994, Lawrence Berkeley Laboratory, Berkeley, Calif.), which includes the following elements:

a conventional motorized venetian blind, modified by the LBL researchers;

a conventional solar Angle-Of-Incidence (AOI) sensor;

a conventional ceiling-mounted workplane illuminance sensor;

a conventional variable-intensity electric lighting system; and a control apparatus.

These elements are interconnected in a known manner to enable the control unit to sense the workplane illuminance and the sun position, and to operate the motorized venetian blind and electric lighting system to maintain a predetermined level of glare-free illumination, for minimum overall energy consumption.

Although such systems were originally proposed many years ago, LBL's is the first and only such system to have been built, tested, and documented in the literature, and it represents the state-of-the-art in integrated daylighting systems. As part of this work, LBL implemented and tested several innovative predictive control algorithms, with the objective of achieving a system operation which balances the solar heat gain (and attendant impact on heating or cooling costs) with the illumination gain (and attendant impact on lighting costs) for minimum overall energy cost. Tests have shown that LBL's system is capable of saving considerable amounts of energy.

DISADVANTAGES OF LBL SYSTEM

Although LBL's system offers very good performance, it suffers from two significant practical limitations which limit its potential for widespread usage: the need for an AOI sensor, and the need for interconnection to the lighting system.

Need for AOI Sensor

Ostensibly, the control algorithms of LBL's system require the capability for a variable angular displacement between the louver surfaces and incident direct solar radiation. Therefore, a simple sun-tracking sensor affixed to one of the louvers (such as the arrangement used in the aforementioned, autonomous glare-blocking systems) cannot be used as the AOI sensor of a system like that shown by LBL, since such a sun-tracking sensor provides a useful output over only a narrow range of incidence angles.

Although Lee et. al. do not describe the design of the AOI sensor used in the LBL system, the problem of finding a practical, low-cost AOI sensor with wide angular operating range has been extensively studied.

For example, the design of a fixed AOI sensor with relatively wide operating range is described in U.S. Pat. No. 4,769,531 to Malek (1988). Malek's system includes a pair of inclined photodetectors for each axis (only a single axis would be required for LBL's system), sampling means to sample and digitize the photodetector outputs, and digital computing means to compute the angle of incidence as a function of the amplitudes of the photodetector outputs.

However, the accuracy of Malek's system depends on the consistency of the angular responses of the photodetectors. Insofar as is known, accuracy sufficient for glare-blocking applications cannot be obtained with small-area photodetectors (such as typical photodiodes); instead, photodetectors with relatively large active areas (such as solar cells) must be used. This increases the size and cost of Malek's sensor, and the obtainable accuracy would still be significantly poorer than that achievable with other approaches (and would likely be insufficient for glare-blocking applications). Moreover, the sampling and computing means required in Malek's system could result in excessive cost and complexity for many daylighting applications.

Another type of known AOI sensor comprises a sun-tracking sensor—of the type previously described—which is mounted on an independent, motorized platform which is continuously servo-positioned to maintain a constant orientation relative to the incident radiation. The angular position of the platform is then measured, and provides an output signal corresponding to the angle of incidence. However, the size, mechanical complexity, and cost of the required independent platform are serious disadvantages of this approach.

Still another type of AOI sensor comprises a photosensor mounted on a rotating or scanning platform; the angular position of the platform is constantly monitored. The output of such a sensor exhibits a peak when the platform orientation is such that the photosensor field-of-view is most closely aligned with the incident radiation. The angular position of the platform at the instant of peak output then corresponds to the approximate angle of incidence. Again, the size, mechanical complexity, and cost of the required platform are serious disadvantages of this approach.

Many other types of AOI sensor are known. All of these suffer from serious limitations in the context of daylighting systems: they are prohibitively complex, large, and expensive for most applications. In fact, the LBL researchers concluded that "Sensors designed to detect sun angle position . . . will require further work before commercialization." (Lee et. al., "Developing Integrated Envelope And Lighting Systems For Commercial Buildings", p. 5).

Moreover, even if a suitable sensor were available at low cost, its installation would itself be prohibitively expensive: due to its relatively large size, such a sensor would typically have to be mounted on the outside of the host building, where it would be subject to environmental stresses (and degradations in accuracy due to accumulations of snow and dirt). Furthermore, the cost of installing the required wiring between the sensor and the control unit would entail a significant expense.

Lee et. al. suggest that a single AOI sensor could be shared among many windows of a host building, reducing the effective sensor cost per window (Lee et. al., "A Comprehensive Approach to Integrated Envelope and Lighting Systems for New Commercial Buildings", LBL Report 35732, May 1994, Lawrence Berkeley Laboratory, Berkeley, Calif., p. 8). However, the required wiring between the sensor and the many dependent window coverings would itself be prohibitively expensive, particularly in retrofit applications.

In summary, the need for a fixed AOI sensor with wide angular operating range is a significant disadvantage of LBL's system. This disadvantage is shared by all known integrated daylighting systems which attempt to regulate the admission of diffuse daylight while simultaneously blocking glare.

Need for Interconnection to Lighting System

As an integrated system, the system shown by LBL coordinates the operation of an automatic window covering with an automatic, variable-intensity lighting system. This coordinated operation maximizes energy savings, but requires an interface between the lighting system and the window covering. The required interface—whether wired or wireless—substantially increases the cost of the system. If a wired interface are used, then its installation would result in a substantial labor expense. If a wireless interface is used, then the required transmitter and receiver (whether optical or radio-frequency) would result in a substantial equipment expense. This disadvantage is shared by all known integrated systems, including integrated systems capable only of brightness-regulating operation (such as the system shown by Grehant).

SUMMARY OF PRIOR-ART DISADVANTAGES

Thus, known daylighting systems suffer from significant limitations:

Known, autonomous, brightness-regulating systems cannot block glare, and—by automatically reducing the amount of admitted daylight in sunny conditions—fail to fully exploit natural daylight for reducing the costs of artificial illumination.

Known, autonomous, glare-blocking systems require a modification to the design of conventional window coverings, and cannot be practically retrofitted to existing window coverings.

Known integrated glare-blocking systems require an AOI sensor which is complex, expensive, and difficult to install. Further, known integrated systems require an interface with an automatic lighting system, which further increases their cost.

These limitations have prevented widespread usage of prior-art daylighting systems, and have thus prevented the tapping of the considerable energy-savings potential of daylighting in commercial office applications.

OBJECTS AND ADVANTAGES

It is therefore an object of this invention to provide an automatic window covering system which is capable of automatically regulating the illumination admitted by a window (especially to admit diffuse daylight while blocking direct solar radiation), and which:

requires no modification to the design of conventional automatic window coverings;

requires no AOI sensor;

requires no interface to an automatic lighting system; and fully exploits available daylight for reducing the energy consumed in artificial illumination.

It is a further object of this invention to provide a system which can readily be used with any type of window covering, especially venetian blinds. Still further objects mid advantages will become apparent from consideration of the drawings and ensuing description.

DESCRIPTION OF DRAWINGS

FIG. 5B is a side view of the louvers of a venetian blind, showing the minimum and maximum louver tilt angles, as well as the minimum louver tilt angle which will block direct solar radiation having a given angle of incidence.

FIG. 5C is a side view of the louvers of a venetian blind, showing the minimum and maximum louver tilt angles, as well as the maximum louver tilt angle which will block direct solar radiation having a given angle of incidence.

LIST OF REFERENCE NUMERALS

Figure 4:
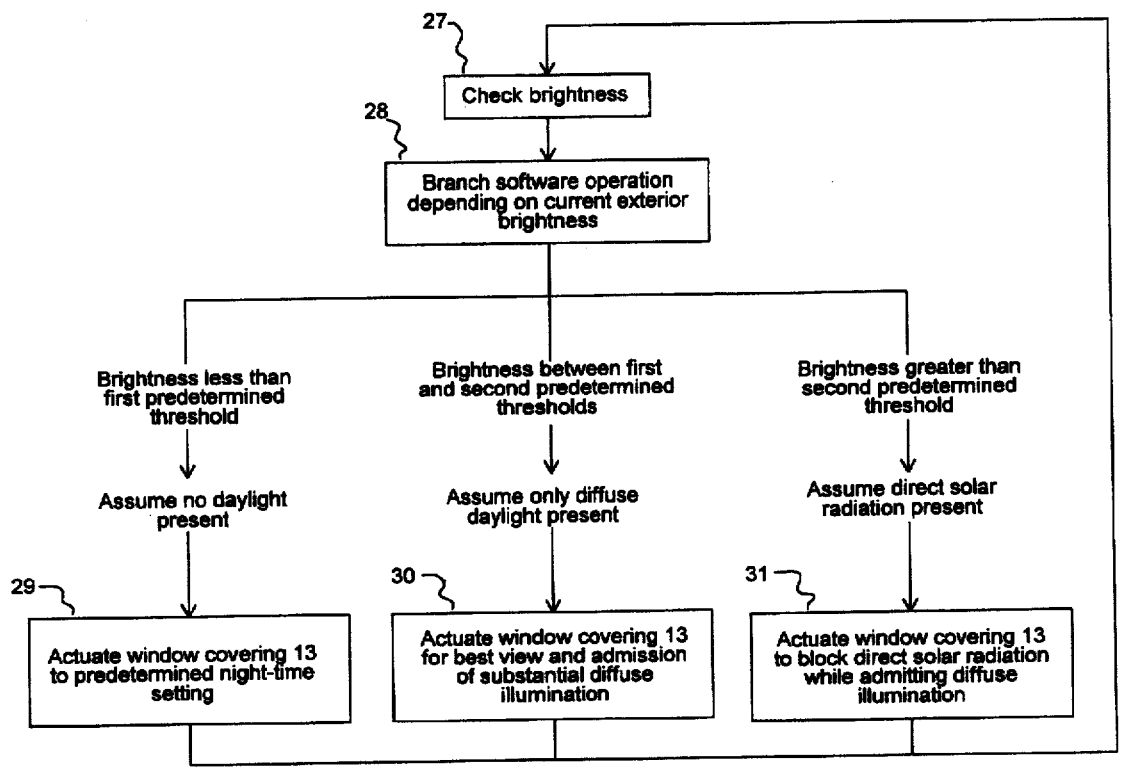
FIG. 4 is a flowchart of the high-level software operation of the preferred embodiment.
Figure 5A:
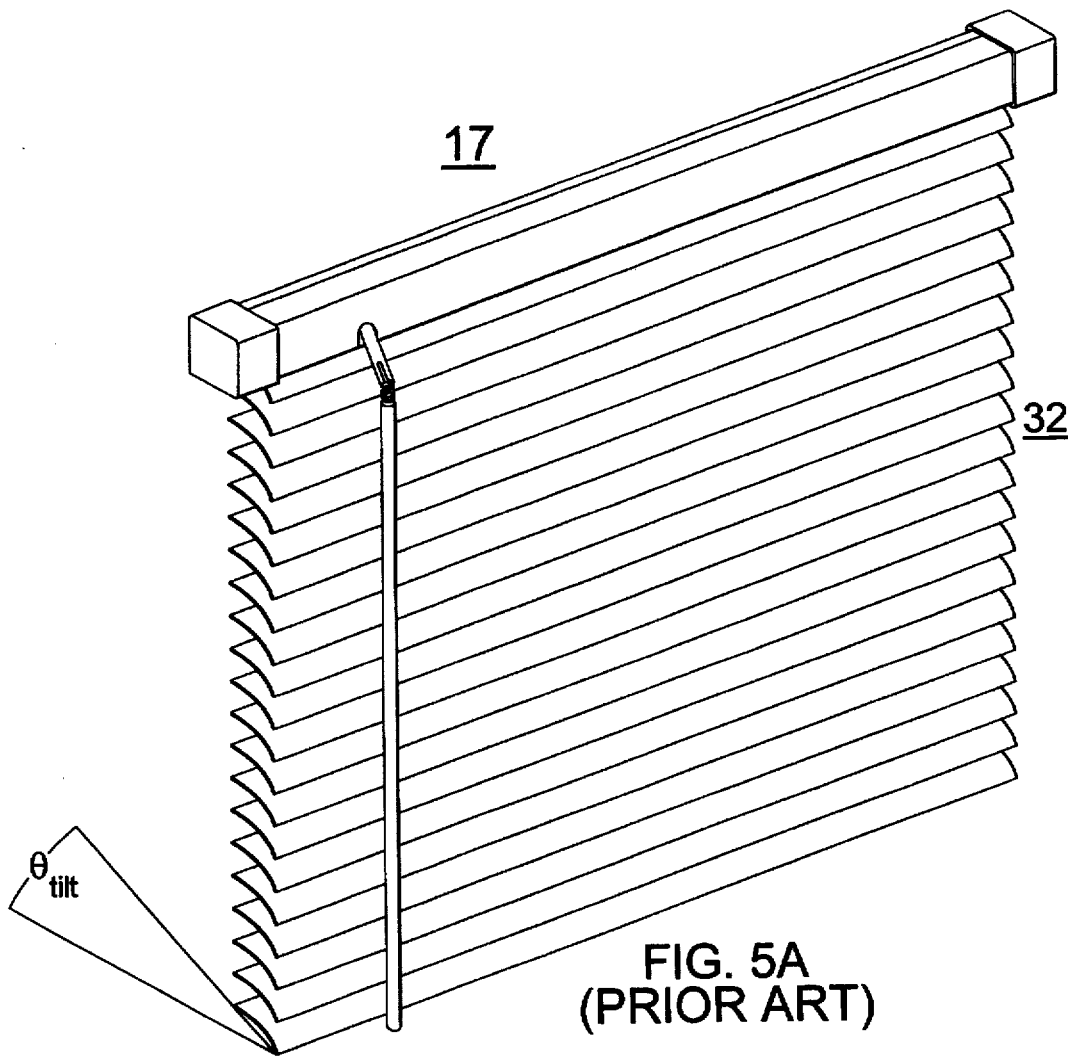
FIG. 5A is an isometric view of a prior-art venetian blind.
Figure 5D:
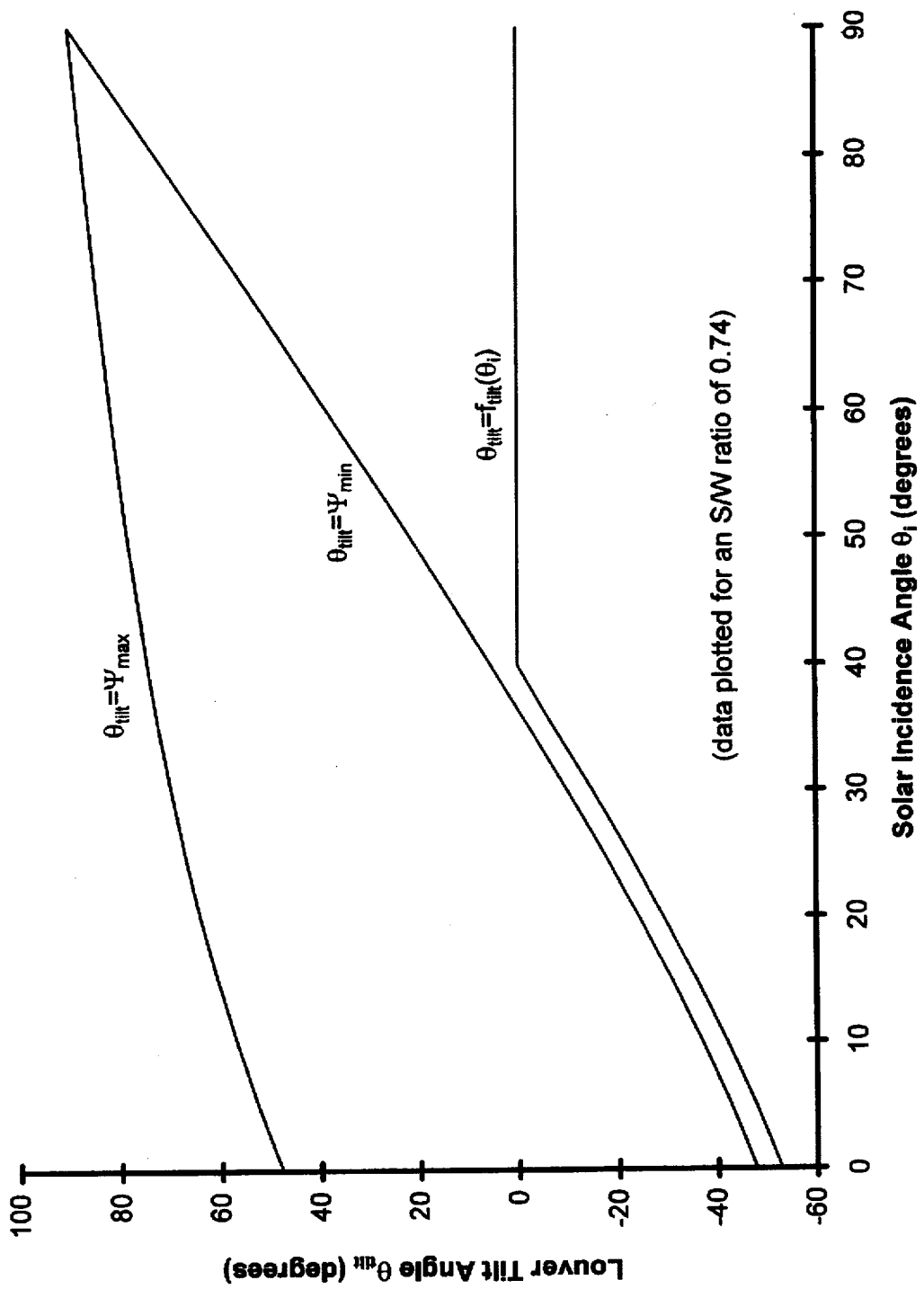
FIG. 5D shows curves of the minimum and maximum louver tilt angles required to block direct solar radiation, as well a curve of the desired louver tilt angle for the preferred embodiment, as functions of the solar incidence angle.
Figure 5E:
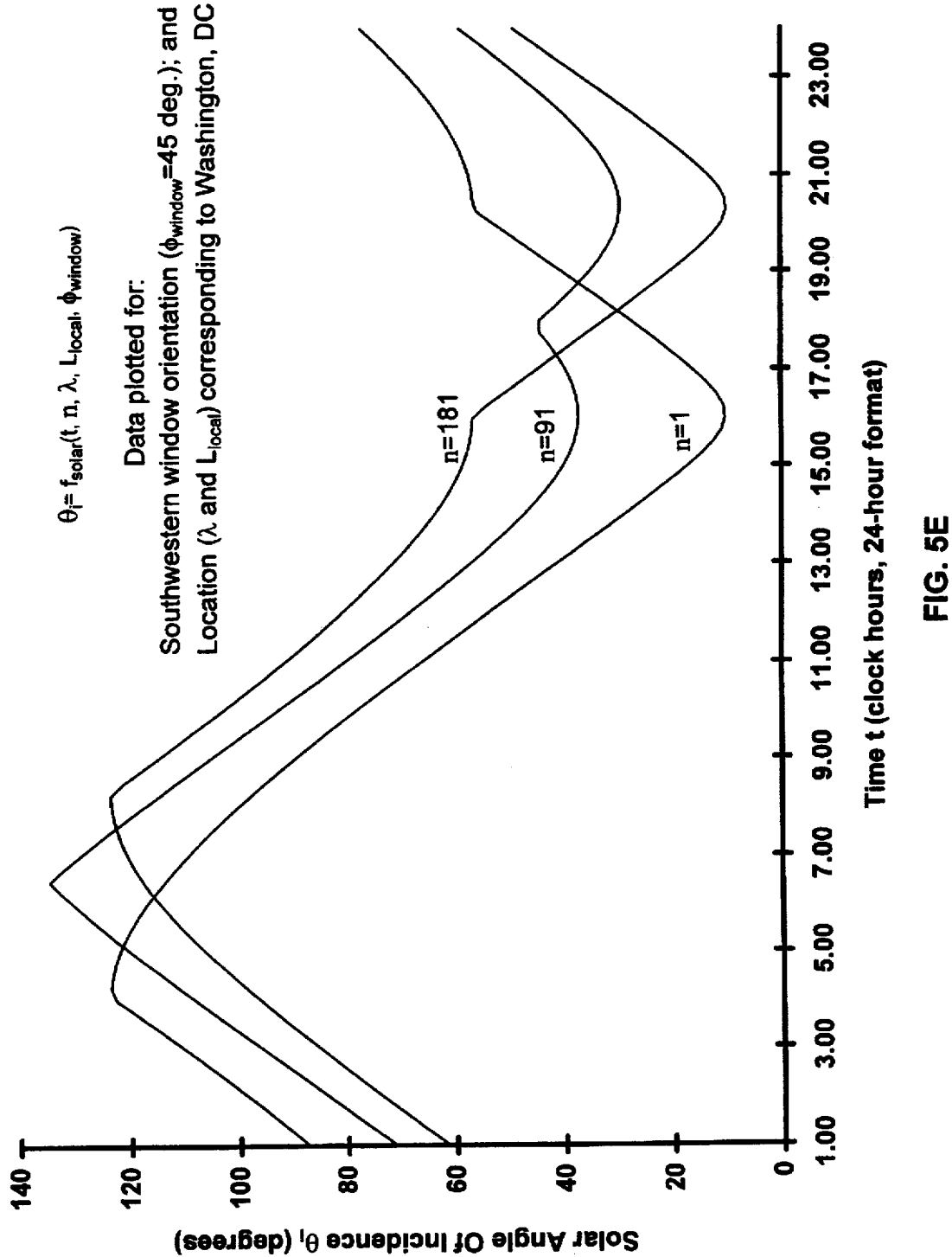
FIG. 5E shows the solar incidence angle, as a function of time and day of the year, for a window facing southwest in Washington, D.C.
Figure 5F:
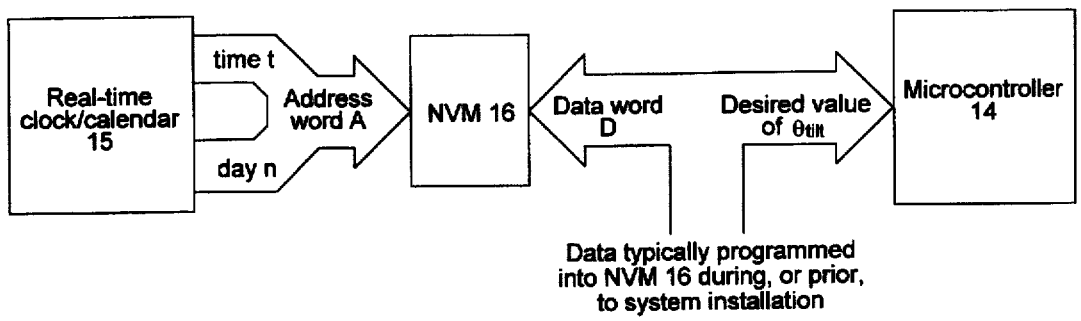
FIG. 5F is a block diagram of the configuration of the data stored in a non-volatile memory of the preferred embodiment.
Figure 5G:
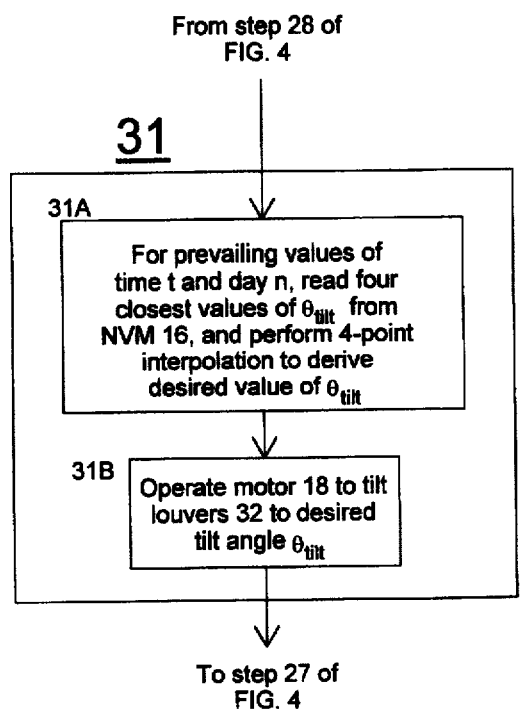
FIG. 5G shows the software operations for a critical step in the operation of the preferred embodiment.
Figure 6A:
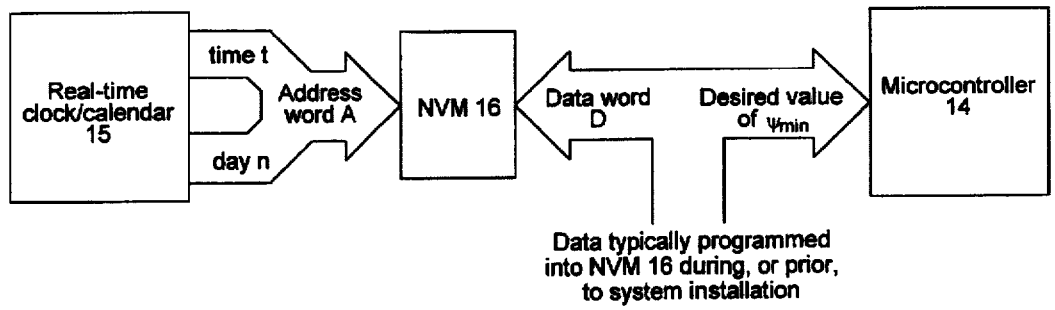
FIG. 6A shows a block diagram of the configuration of the data stored in a non-volatile memory of a first alternative embodiment.
Figure 6B:
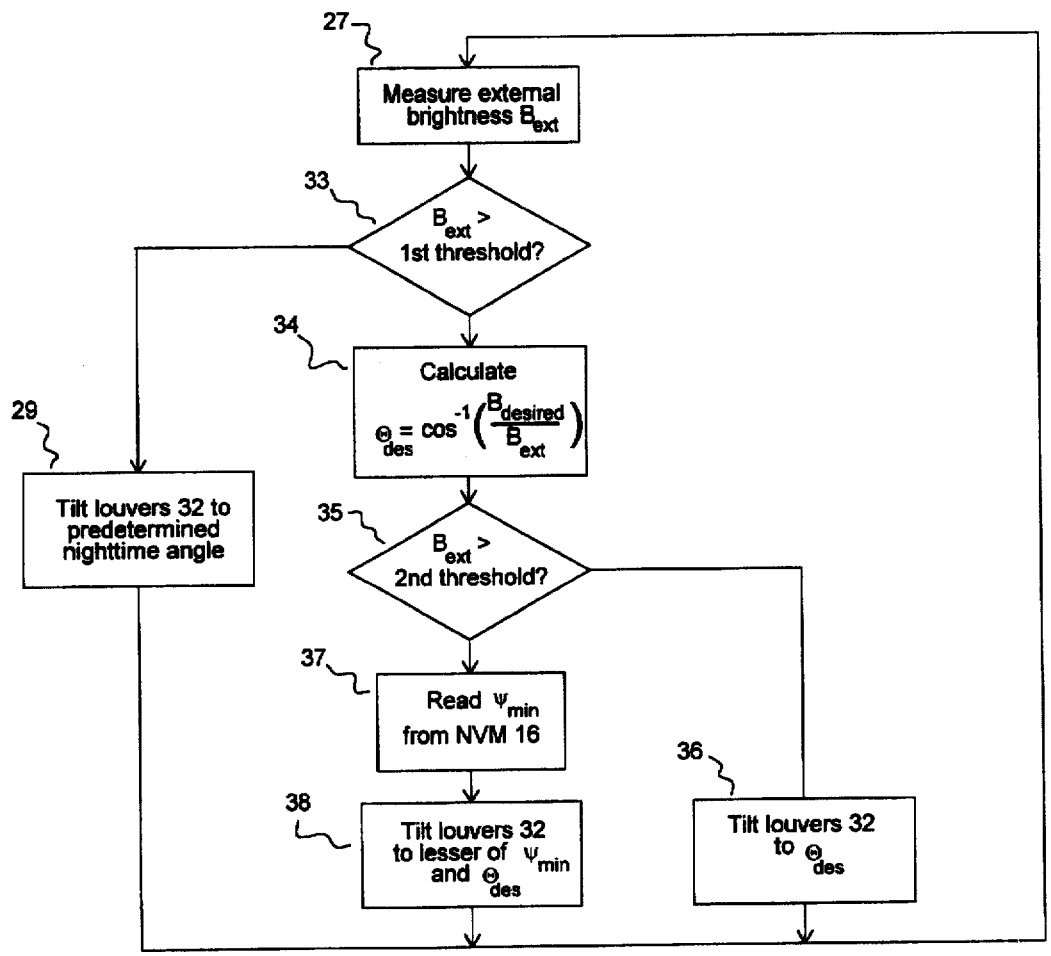
FIG. 6B shows a flowchart of the high-level software operations performed in the first alternative embodiment.
Figure 6C:
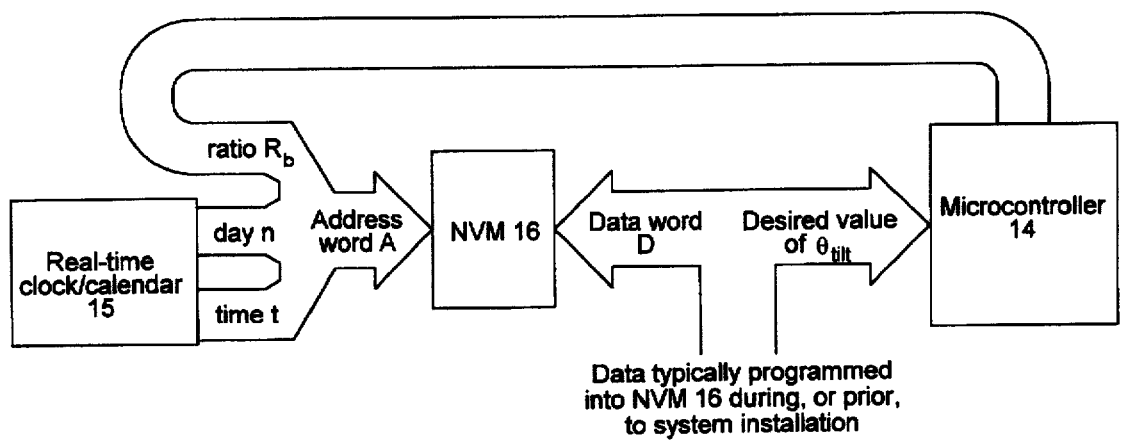
FIG. 6C shows a block diagram of the configuration of the data stored in a non-volatile memory of a second alternative embodiment.
Figure 6D:
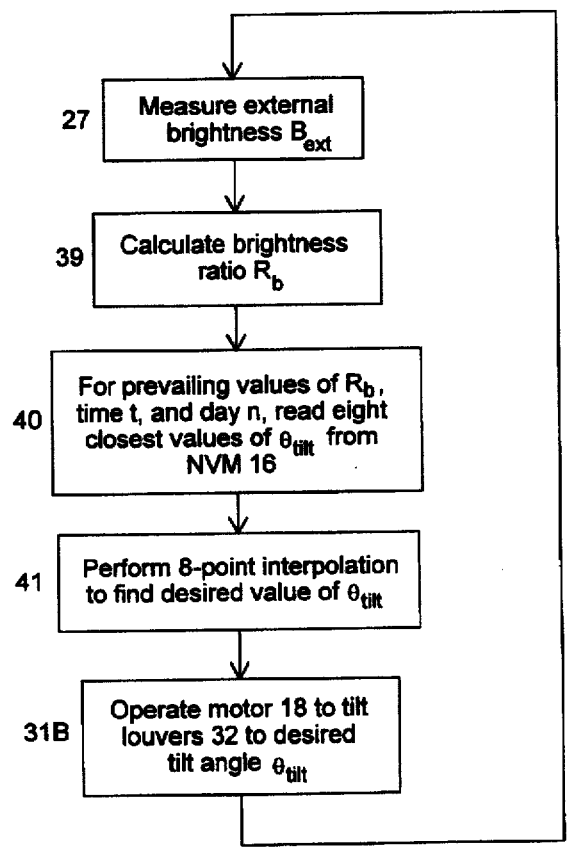
FIG. 6D shows a flowchart of the high-level software operations performed in the second alternative embodiment.

| | LIST OF REFERENCE NUMERALS |
|---|---|
| 10 | automatic window covering system |
| 11 | control unit |
| 12 | brightness sensor |
| 13 | electronically controlled window covering |
| 14 | microcontroller |
| 15 | real-time clock/calendar |
| 16 | Non-Volatile Memory (NVM) |
| 17 | venetian blind |
| 18 | electric motor |
| 19 | switch array |
| 20 | position feedback sensor |
| 21 | window |
| 22 | desk |
| 23 | adaptive lighting system |
| 24 | illuminance sensor |
| 25 | control unit |
| 26 | lamp |
| 27 to 31 | software steps of FIG. 4 |
| 32 | louvers |
| 31A, B | software steps of FIG. 5G |
| 33 to 38 | software steps of FIG. 6B |
| 39 to 41 | software steps of FIG. 6D |

| | LIST OF FUNCTIONS, PARAMETERS, QUANTITIES, AND VARIABLES |
|---|---|
| A | variable corresponding to the digital address word of NVM 16 |
| α | variable corresponding to the effective aperture area of window covering 13 |
| $B_{admit}$ | variable corresponding to the brightness of the illumination admitted by window covering 13 |
| $B_{desired}$ | variable or parameter (depending on embodiment) corresponding to desired brightness of admitted illumination |
| $B_{ext}$ | variable corresponding to brightness (i.e., log of illuminance) incident on outer surface of window 21 |
| D | variable corresponding to the data word of NVM 16 |
| $DESIGN_{WC}$ | parameter corresponding to fixed design characteristics of window covering 13 |

-continued

LIST OF FUNCTIONS, PARAMETERS, QUANTITIES, AND VARIABLES

| | |
|---|---|
| $f_{brightness}$ | function defining critical tilt angle $\psi_{min}$ as a function of variables t and n |
| $f_{composite}$ | function which defines required tilt angle $\theta_{tilt}$ as a function of t, n, $\lambda$, $L_{local}$, $\phi_{window}$, and S/W for operation of the preferred embodiment |
| $f_{fixed}$ | function which defines Setting$_{wc}$ on the basis of variables t n, and $B_{ext}$ |
| $f_{operate}$ | function which defines Setting$_{wc}$ on the basis of variables $I_{desired}$, t n, and $B_{ext}$ |
| $f_{preferred}$ | function which defines required tilt angle $\theta_{tilt}$ as a function of t and n, for operation of the preferred embodiment |
| $f_{ratio}$ | function which defines Setting$_{wc}$ or $\theta_{tilt}$ (depending on the embodiment) as functions of variables t, n, and $R_b$ |
| $f_{regulate}$ | function which defines Setting$_{wc}$ on the basis of arguments $I_{desired}$, DESIGN$_{wc}$, LOC$_{win}$, ORIENT$_{win}$, t, n, and $B_{ext}$ |
| $f_{solar}$ | function which defines expected solar incidence angle $\theta_i$ as a function of t, n, $\lambda$, $L_{local}$, and $\phi_{window}$ |
| $f_{tilt}$ | function which defines $\theta_{tilt}$, as a function of solar elevation angle of incidence $\theta_i$ and ratio S/W, for the preferred embodiment |
| $\phi_i$ | variable corresponding to solar azimuth angle of incidence on window 21 |
| $\phi_{window}$ | parameter corresponding to azimuth orientation of window 21 |
| $I_{desired}$ | variable or parameter (depending on embodiment) corresponding to desired characteristic of admitted illumination |
| $I_{diffuse}$ | quantity corresponding to diffuse illumination passing through venetian blind 17 |
| $I_{direct}$ | quantity corresponding to direct radiation from the solar disk passing through venetian blind 17 |
| $I_{indirect}$ | quantity corresponding to indirect radiation from the solar disk passing through venetian blind 17 |
| J | variable (binary) indicating presence of direct solar radiation |
| k | constant relating admitted brightness $B_{admit}$ to product of external brightness $B_{ext}$ and aperture area $\alpha$ of window covering 13 |
| $\lambda$ | parameter corresponding to the local latitude of window 21 |
| $L_{local}$ | parameter corresponding to the local longitude of window 21 |
| LOC$_{win}$ | parameter corresponding to geographic location (latitude and longitude) of window 21 |
| n | variable corresponding to day of the year (where n = 1 corresponds to 1 January) |
| ORIENT$_{win}$ | parameter corresponding to orientation (in azimuth for vertical windows, and in elevation for horizontal windows) of window 21 |
| $\Theta_{des}$ | variable corresponding to the required value of louver tilt $\theta_{tilt}$ to produce desired brightness $B_{desired}$ of admitted illumination |
| $\theta_i$ | variable corresponding to solar elevation angle of incidence on widow 21 |
| $\theta_{tilt}$ | variable corresponding to tilt angle, with respect to the horizontal, of louvers 32 of blind 17 |
| $\Theta_{tiltmax}$ | parameter corresponding to maximum louver tilt angle $\theta_{tilt}$ of venetian blind 17 |
| $\Theta_{tiltmin}$ | parameter corresponding to minimum louver tilt angle $\theta_{tilt}$ of venetian blind 17 |
| $\theta_{window}$ | parameter corresponding to elevation orientation of window 21, for windows inclined from the vertical |
| Res$_t$ | parameter corresponding to the resolution of time t |
| $R_b$ | variable corresponding to ratio of $B_{desired}$ to $B_{ext}$ |
| S | parameter corresponding to vertical spacing of louvers 32 of blind 17 |
| Setting$_{wc}$ | variable corresponding to desired setting of window covering 13 to achieve a predetermined characteristic of admitted illumination |
| t | variable corresponding to local time of the day |
| W | parameter corresponding to width (i.e., short dimension, or chord) of louvers 32 of blind 17 |
| $\psi_{max}$ | variable corresponding to maximum louver tilt angle of blind 17 which will block direct solar component $I_{direct}$ |
| $\psi_{min}$ | variable corresponding to minimum louver tilt angle of blind 17 which will block direct solar component $I_{direct}$ |

SUMMARY OF THE INVENTION

My invention is an autonomous, automatic window covering system for daylighting applications. It is preferably used with an adaptive, variable-intensity electric lighting system, but operates independently of—and requires no connection to—such a system. It is capable of regulating the illumination admitted by a window without need for an interior illuminance sensor, sun-tracking sensor, or solar Angle-Of-Incidence (AOI) sensor, as required in prior-art systems.

My invention consists essentially of a conventional electronically variable window covering, a conventional control apparatus, and a conventional external brightness sensor. The window covering has a variable setting which regulates the desired characteristic of the admitted illumination. The control apparatus is connected to the window covering and the brightness sensor in a known manner to enable the control apparatus to register the brightness of the daylight incident on the host window, and to actuate the window covering to various settings. The control apparatus additionally includes means for periodically registering the time and day of the year.

The control apparatus periodically actuates the window covering to a setting which maintains a desired characteristic of the admitted illumination. This setting is a predetermined function of certain variables and parameters:

the time, the day of the year, the geographic location of the host window, the orientation of the window, the brightness of daylight incident on the window, and the desired characteristic (e.g., brightness) of the admitted illumination.

This predetermined function can be evaluated in real-time, but is preferably evaluated beforehand for the expected ranges of the salient variables, with the results stored within a memory contained in the control apparatus. Thereafter, the data stored in the memory is periodically referenced in a table look-up operation to determine the desired setting of the window covering.

In a preferred embodiment, the electronically actuated window covering is a motorized venetian blind, and the control apparatus is a microcontroller with integral Non-Volatile Memory (NVM) and real-time clock/calendar.

The preferred embodiment operates to block the admission of direct solar radiation while admitting diffuse daylight. The NVM holds a look-up table which defines the venetian blind louver tilt angle required to block direct solar radiation, as a function of time and day of the year, for the location and orientation of the host window. This look-up table data is loaded into the NVM when the system is installed on the host window.

After installation, the microcontroller:

uses the look-up table data stored in the NVM, together with the state of the real-time clock/calendar, to periodically infer the required tilt angle to block direct solar radiation;

uses the output of the brightness sensor to determine whether or not direct solar radiation is present (it could be blocked, for example, by clouds or terrestrial objects); and actuates the venetian blind to block direct solar radiation (when present), while admiring diffuse daylight.

The look-up table approach avoids the need for a sun-tracking or solar Angle-Of-Incidence (AOI) sensor, as used in the prior-art systems, since the required solar geometric information is implicit in the data of the look-up table. Through use of interpolation, the size of the required look-up table can be reduced to the extent that it can fit within the on-chip Programmable Read-Only Memory (PROM) or Electrically Erasable Programmable Read-Only Memory (EEPROM) space of many low-cost microcontrollers. Moreover, many available microcontrollers include on-chip real-time clock/calendars. Thus, the microcontroller, the NVM, and the real-time clock/calendar can be conveniently packaged in a single integrated circuit, thereby providing an extremely practical, low-cost solution to the problem of accurately determining the prevailing solar geometry (as required for glare-blocking operation of a venetian blind).

Since the preferred embodiment operates in an open-loop manner to admit diffuse daylight, it requires no interior-mounted illuminance sensor and, hence, is insensitive to the total interior illuminance. Therefore, it operates to admit the maximum available amount of glare-free diffuse daylight, regardless of the illuminance contributed by the interior lighting system. Thus, the preferred embodiment provides the maximum amount of useful natural illumination—and, hence, the maximum possible energy savings when used with an adaptive lighting system—without need for coordinated operation with (or interface to) the lighting system.

While the primary operating object of the preferred embodiment is the blocking of direct solar radiation (and attendant glare), alternative embodiments can be made to regulate any illumination characteristic (e.g., brightness, polarization, spectral balance, etc.) which can be modulated by the window covering, and which can be expressed as a function of the setting of the window covering, the external brightness, the time of the day, the day of the year, and the geographic location and orientation of the host window.

For example, an alternative embodiment of my invention is capable of regulating the brightness of the admitted diffuse daylight, while simultaneously blocking direct solar radiation (and attendant glare). Such an embodiment comprises the same hardware elements as the preferred embodiment, but requires a more complex operating algorithm. This algorithm embodies a model which expresses the predicted brightness of the admitted illumination as a function of the setting of the window covering, the external brightness, the time of the day, the day of the year, and the geographic location and orientation of the host window.

While the preferred embodiment of my invention includes an electronically controlled venetian blind, any type of electronically controlled or motorized window covering could be used, such as a motorized pleated shade, a motorized curtain, a motorized roller shade, an electrochromic glazing, or a liquid-crystal panel. Unlike venetian blinds, some of these window coverings are incapable of selectively blocking radiation from a given direction; however, such window coverings can still be advantageously used in an automatic brightness-regulating system according to my invention.

DESCRIPTION OF THE PREFERRED EMBODIMENT

Figure 1:
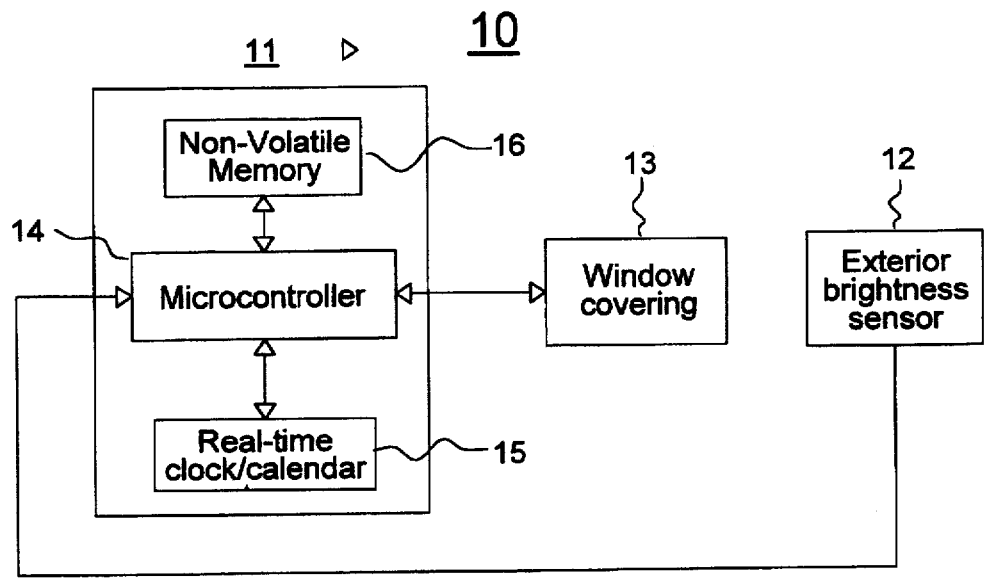
FIG. 1 is a block diagram of a preferred embodiment of an autonomous daylighting system according to the subject invention.

FIG.1: Block Diagram of Automatic Window Covering System 10

FIG. 1 shows a block diagram of a preferred embodiment of an automatic window covering system 10 according to the subject invention. It consists of a conventional control unit 11, a conventional exterior brightness sensor 12, and a conventional electronically controlled window covering 13. Control unit 11 is connected to window covering 13 in a known manner to enable software-controlled adjustment of the illumination transmission characteristics of window covering 13. Brightness sensor 12 is connected to control unit 11 in a known manner to enable control unit 11 to register the level of exterior brightness. The use of such elements for these purposes is well-known in the art; such a configuration is thoroughly described, for example, in my aforementioned co-pending patent application, Ser. No. 08/505,845. More detail on control unit 11, brightness sensor 12, and window covering 13 is given in the following paragraphs.

Control unit 11

Control unit 11 comprises a conventional microcontroller 14, a conventional real-time clock/calendar 15, and a conventional Non-Volatile Memory (NVM) 16. These elements are interconnected in a known manner to enable microcontroller 14 to exchange data with clock/calendar 15 and NVM 16.

REQUIREMENTS

Microcontroller 14

As is known in the art, a microcontroller is a self-contained control device which includes a microprocessor, a modest amount of data and program memory, and Input/Output (I/O) peripherals in a single Integrated Circuit (IC). The requirements for microcontroller 14 are modest relative to the capabilities of current devices. A suitable device can be chosen in accordance with conventional practice, based on the design and operating details presented herein.

Typical embodiments of system 10 will require a data word of at least 4 bits, at least 32 bytes of Random Access Memory (RAM), at least 1 kilobyte of Read-Only Memory (ROM), a clock speed of at least 32 kilohertz, and at least 12 I/O lines. These requirements are well within the capabilities of current low-cost devices. Examples of suitable microcontrollers include the Intel 8051 series, the Microchip PIC16CXX and PIC17CXX series, the Motorola 68HC11 series, and the Zilog Z-8 series. Many other suitable devices are also available.

Clock/Calendar 15

Clock/calendar 15 can be any conventional device which is capable of tracking the time and day of the year, preferably with crystal-controlled accuracy; such clock/calendars are used in many commercially available electronic appliances. Clock/calendar 15 can be a physically distinct hardware element, or can be implemented via software within microcontroller 14. If a physically distinct hardware element, Clock/calendar 15 can be a separate device, or can be incorporated in the same Integrated Circuit (IC) with microcontroller 14. In the preferred embodiment, clock/calendar 15 is implemented in a conventional manner, via a combination of hardware and software, within microcontroller 14. Any of the aforementioned microcontrollers are capable of implementing such a real-time clock/calendar.

NVM 16

Salient factors affecting the selection of memory devices include requirements for capacity, read/write speed, and ability to be erased and reprogrammed. The read/write speed requirements of NVM 16 (less than a few milliseconds per word) are well within the capabilities of virtually all current non-volatile memory technologies. Moreover, the capability for reprogramming—while desirable—is not strictly necessary for NVM 16, so that non-erasable technologies (such as Programmable Read-Only Memory, or PROM) could be used.

As will be subsequently described in detail, the required capacity of NVM 16 ranges from less than 1 kilobyte to 16 kilobytes, depending on the desired capabilities of system 10. Again, this range is well within the capabilities of available semiconductor memory devices. Thus, virtually any non-volatile memory technology—e.g., PROM, Erasable PROM (EPROM), Electrically-Erasable PROM (EEPROM), battery-backed Static Random Access Memory (SRAM), or flash memory—could be used to implement NVM 16.

In the preferred embodiment (which requires a capacity of at least 1 kilobyte), NVM 16 is a 2 kilobyte EEPROM device which is contained in the same IC as microcontroller 14.

However, other implementations of NVM 16 may be advantageous in certain applications. For example, in alternative embodiments of system 10 which require greater memory capacity (e.g., 16 kilobytes), NVM 16 may be too large—given the prevailing state-of-the-art—to be cost-effectively integrated in the same package with microcontroller 14. In this case, NVM 16 could be packaged as a physically separate hardware element. A serial EEPROM would be particularly advantageous in such a configuration, due to its low cost, small size, and small pin count relative to other reprogrammable, non-volatile memory technologies.

PREFERRED EMBODIMENT

The preferred embodiment of control unit 11 is the AT89C2051 microcontroller, manufactured by Atmel Corp., of San Jose, Calif. This device incorporates a microcontroller and a 2 kilobyte flash memory in a single low-cost IC. Thus, the device provides the required capabilities of microcontroller 14 as well as NVM 16. Moreover, the device includes two 16-bit hardware counters, facilitating the software implementation of clock/counter 15.

Brightness sensor 12

REQUIREMENTS

Brightness sensor 12 is a conventional device capable of sensing the exterior brightness in such a manner that a digital value corresponding to the brightness can be registered within microcontroller 14. As will be subsequently described in greater detail, brightness sensor 12 serves two purposes in system 10:

- it enables the detection of the presence of direct solar radiation, and
- it enables the measurement of the brightness (as would be perceived by the human eye) of incident diffuse illumination.

These purposes impose different requirements on sensor 12, but the aggregate requirements are modest and easily satisfied by a variety of available, low-cost devices.

Detection of Direct Solar Radiation

Detection of the presence of direct solar radiation is a relatively easy task, due to the great difference in illuminance between the presence and absence of the direct solar component. This great difference in illuminance implies that neither high accuracy—nor a well-defined transfer function—is required of sensor 12. However, due to the large variation in the relative position of the sun, sensor 12 should have as wide a field-of-view as possible. A hemispherical field-of-view (such as that provided by the triple-photodiode brightness sensor shown by Kern) would be ideal, but a 120-degree solid-angle response would suffice in many applications. Fortunately, due to the high illuminance associated with the presence of direct solar radiation, the electrical response of sensor 12 need not be flat across the field-of-view; instead, a relatively large variation in the angular response (e.g., 10 dB or more) is tolerable.

Measurement of Perceived Brightness of Diffuse Illumination

The illuminance of diffuse daylight typically varies over a very wide range (e.g., 90 dB or more), depending on the location, orientation, weather, time-of-day, and other factors. However, if illuminance levels below those typically associated with dusk or dawn are excluded, the dynamic range is much smaller (e.g., 30 dB). Sensor 12 should have sufficient dynamic range to encompass at least this range of illuminance. However, as will become apparent in the subsequent discussions, only modest accuracy is required over this dynamic range, to the extent that accuracy will typically not be a driving requirement in the implementation of sensor 12.

In contrast to the detection of direct solar radiation, the measurement of the diffuse brightness—for the purposes of system 10—does not require a wide field-of-view. In practice, a relatively narrow field-of-view (e.g., a solid angle of 20 degrees between the −3 dB points of the angular response)—with the peak response oriented normal to the surface of the window—will provide adequate performance for most applications of system 10.

Aggregate Requirements for Sensors 12

Thus, sensor 12 should have a dynamic range of at least 30 dB, and an angular response flat to within 10 dB over 120 degrees, and to within 3 dB over 20 degrees.

Many sensors capable of meeting the aforementioned requirements are known in the art. For example, both photodiodes and photoresistors capable of meeting these requirements are currently available at low cost.

PREFERRED EMBODIMENT OF SENSOR 12

In the preferred embodiment, brightness sensor 12 comprises the model TLS235 light-to-frequency converter IC manufactured by Texas Instruments, Inc. This IC has a dynamic range of 120 dB and can be directly connected to microcontroller 14. The IC includes a photodiode, which in the preferred embodiment is oriented so that its photoactive surface is parallel to the host window (not shown). The IC produces a signal whose frequency is proportional to the illuminance incident on the photoactive surface. This frequency is measured by microcontroller 14 in a known manner, and the logarithm of the resulting digital value is taken (in a conventional software operation) to obtain a measure of the perceived brightness.

Electronically controlled window covering 13

REQUIREMENTS FOR WINDOW COVERING 13

Electronically controlled window covering 13 can be any window covering which is capable of varying, in response to an electrical signal, the characteristics of the illumination admitted by a window. Ideally, window covering 13 would be capable of independently varying—in response to an electrical signal—all salient characteristics of the admitted illumination, such as intensity, spectral balance, and polarization; window covering 13 would ideally also be capable of selectively screening illumination incident from a given direction. However, a window covering providing the capability to electronically vary all of these characteristics is not yet practical. Fortunately, such a capability—while advantageous—is not necessary for useful implementations of system 10. On the contrary, a useful implementation of system 10 can be realized if window covering 13 provides the capability to vary just one of the aforementioned parameters in response to an electrical signal.

Conventional electronically controlled window coverings can be broadly grouped into two categories:

- those which are capable of varying only the amount of admitted light, and
- those which are additionally capable of selectively screening illumination from a given direction.

Window coverings which are capable of varying the effective aperture area of the host window—such as curtains, pleated shades, or roller shades—fall into the former category, while louvered window coverings—such as venetian blinds, shutters, and light lenses—fall into the latter category. Electrochromic glazings, whose color can be varied in response to an electrical signal, are effectively in the former category, since the primary effect of the color variation is to vary the mount of transmitted light. Window coverings from either category can be used in useful embodiments of system 10. However, electronically controlled window covering 13 preferably includes a window covering of the latter category, since such window coverings can be used to block direct solar radiation while simultaneously providing some independent adjustment of the amount of transmitted illumination.

Figure 2:
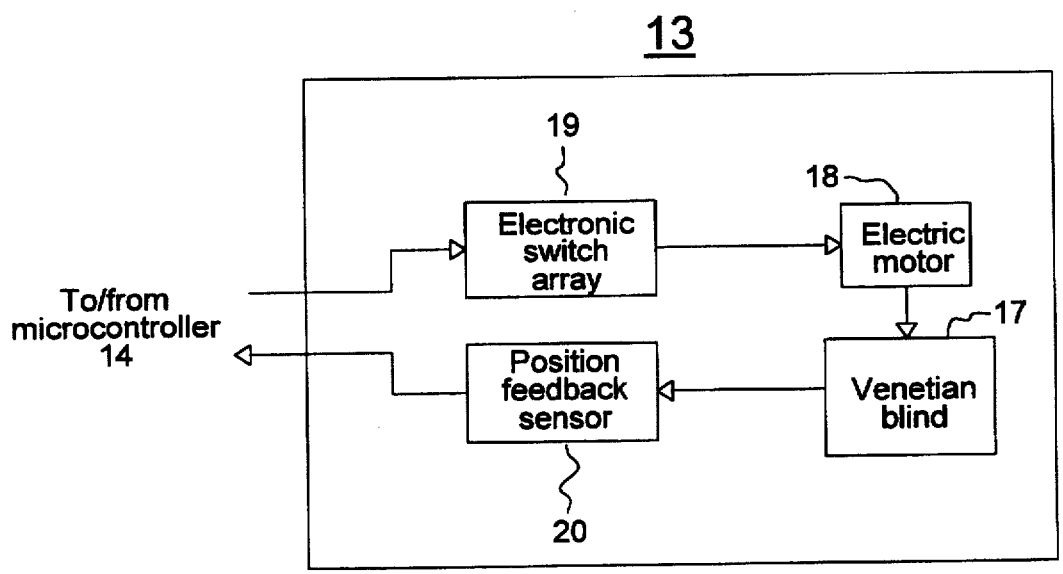
FIG. 2 is a block diagram of an electronically controlled window covering used in the preferred embodiment.

FIG. 2: Preferred Embodiment of Window Covering 13

In the preferred embodiment, electronically controlled window covering 13 is a conventional, motorized, horizontal venetian blind which is connected to microcontroller 14 in a known manner to enable microcontroller 14 to control the orientation, or tilt, of the louvers of the venetian blind. Many suitable motorized venetian blinds are known, such as:

- the automatic venetian blind shown in U.S. Pat. No. 5,413,161 to Corazzini (1995);
- the model MB-1000 motorized miniblind manufactured by Solartronics, Inc., of Buffalo, N.Y.; or
- the automatic venetian blind control system shown in my co-pending application, Ser. No. 08/505,845.

Any one of these (or any other conventional motorized horizontal venetian blind) could be used as electronically controlled window covering 13.

FIG. 2 shows a block diagram of the preferred embodiment of electronically controlled window covering 13. It consists of a conventional horizontal venetian blind 17, an electric motor 18, an electronic switch array 19, and a position feedback sensor 20.

Blind 17 is a conventional horizontal venetian blind consisting of an array of louvers whose orientation, or tilt, can be varied through rotation of a shaft.

Electric motor 18 is a conventional electrically-driven rotary actuator, such as a brush-commutated DC motor, brushless DC motor, or stepping motor. In the preferred embodiment, electric motor 18 is a brush-commutated, permanent-magnet DC motor (although, as will be subsequently described, a stepping motor will be advantageous in certain applications). Motor 18 is coupled to the tilt-adjustment shaft of blind 17 in a known manner so that its operation adjusts the tilt of the louvers of blind 17.

Electronic switch array 19 is a conventional arrangement of electronic switching devices, such as transistors or relays, which enable bi-directional operation of an electric motor in response to signals from a microcontroller. In the preferred embodiment, electronic switch array 19 is the Si9986CY Buffered H-Bridge motor driver Integrated Circuit (IC), manufactured by Siliconix Corp. Switch array 19 is connected to motor 18, to microcontroller 14, and to a power source (not shown) in a known manner, so that motor 18 can be operated bi-directionally in response to control signals from microcontroller 14.

Position feedback sensor 20) is a conventional sensor capable of registering the movement of an electromechanically actuated member. Such sensors include rotary optical encoders, limit switches, linear displacement transducers, and current-discontinuity detectors (i.e., to detect the commutation-induced discontinuities in the drive current of brush-commutated DC motors). Such a sensor can be coupled directly to blind 17, or directly to motor 18 (and, hence, indirectly to blind 17). In the preferred embodiment, position feedback sensor 20 consists of an electronic current-discontinuity detector which produces a logic-level pulse on each commutation event of motor 18; thus, each output pulse of position feedback sensor 20 represents a fixed angular displacement of motor 18 (and hence, a fixed change in the angle of tilt of the louvers of blind 17). The design of such a feedback sensor is described in detail in my above-referenced co-pending application, Ser. No. 08/505, 845.

Thus, it can be seen that microcontroller 14 is capable of controlling the operation of motor 18 (via switch array 19), causing a change in the louver tilt angle of blind 17. It can also be seen that microcontroller 14 is capable of registering (via position feedback sensor 20) the louver tilt angle of blind 17. Practitioners in the art will recognize this configuration as that of a conventional, microcontroller-based, digital servopositioning system. This configuration is thoroughly described in the literature and is used in a variety of commercially available electronic devices. For example, this type of servopositioning system is used in many of the power seat and power window mechanisms in modem luxury automobiles. Design and operating details of such a digital servopositioning system for use with a venetian blind are given in my above-referenced co-pending application, Ser. No. 08/505,845.

THEORY OF OPERATION

The operation of the preferred embodiment is described in detail in subsequent sections of this disclosure. However, as a further aid in understanding the operation of the preferred embodiment, and—in particular—to facilitate understanding of the operation of the invention in a general sense, the general operating theory is presented first.

General Operating Principle

Prior-art automatic window covering systems intended for daylighting applications generally use a closed-loop illumination control approach, in which a desired characteristic of the admitted illumination is regulated by measuring that characteristic, comparing it to a desired value, and actuating the window covering on the basis of the difference between the measured and desired values. However, the sensors required for this measurement (e.g., interior illuminance sensors for brightness-regulating systems, and solar AOI sensors for glare-blocking systems) are prohibitively complex and expensive for many applications.

In contrast, the subject invention uses a nearly open-loop approach to avoid the need for such sensors. This approach recognizes and exploits four facts:

A) For daylighting purposes, it is not necessary to maintain a high degree of accuracy in the regulation of the illumination admitted by a window covering. This is due to two factors. First, provided that glare or excessive brightness is absent, the human eye is relatively tolerant of variations in the ambient illumination. Second, in many cases, an automatic, adaptive lighting system can be used (as will be subsequently described) to compensate for variations in the available natural illumination.

B) It is known in the art that the illumination admitted by a window covering is completely determined by the characteristics of the illumination incident on the host window and by the solar-optical properties of the window covering itself. The solar-optical properties of many types of window covering, with accuracy sufficient for daylighting purposes, are known in the art.

C) For daylighting purposes, the illumination incident on a window can be completely characterized by two variables: the brightness (i.e., the log of the illuminance) incident on the window surface, and the relative solar geometry (i.e., the solar elevation and azimuth with respect to the window surface). It is generally believed in the art that these two variables are not sufficient to characterize the incident illumination with a high degree of accuracy. However, in accordance with (A) above, a high degree of accuracy is not required for daylighting purposes, and such a characterization can support very good daylighting performance.

D) It is known that the solar geometry relative to a particular window can be analytically expressed as a function of the time of the day, the day of the year, and the geographic location (i.e., latitude and longitude) of that window. Thus, the solar geometry need not be measured directly (as in prior-art systems), but can be analytically inferred from other information.

Therefore, according to the subject invention, the approximate setting of a window covering required to maintain a desired characteristic of the admitted illumination can be found on the basis of seven categories of information:

the desired characteristics (e.g., the desired brightness, ratio of diffuse to direct illumination, etc.) of the admitted illumination, the salient design characteristics of the window covering, the geographic location of the host window, the orientation of the window, the time, the day of the year, and the brightness of daylight incident on the outer surface of the window.

Of these, the desired characteristics of the admitted illumination will, by definition, be known. The design characteristics for a particular window covering will be fixed and, typically, well-understood. The geographic location and orientation of a particular window will be fixed and easily determined. And the remaining variables—the time, the day of the year, and the brightness of the incident daylight—can be readily quantified without need for complex hardware or software. Thus, according to the subject invention, all the information necessary to regulate the illumination admitted by a window covering can be readily obtained without an interior illuminance sensor or solar AOI sensor (as required in prior-art systems).

Regulating Function

The mathematical relationship between the required setting of the window covering and the aforementioned categories of information is hereinafter referred to as the regulating function $f_{regulate}$, such that:

$$\text{Setting}_{wc} = f_{regulate}(I_{desired}, \text{Design}_{wc}, \text{Loc}_{win}, \text{Orient}_{win}, t, n, B_{ext}),$$

where:

$\text{Setting}_{wc}$ is the required setting of the window covering;

$I_{desired}$ represents the desired characteristics of the admitted illumination;

$\text{DESIGN}_{wc}$ represents the salient design characteristics of the window covering;

$\text{LOC}_{win}$ represents the geographic location (i.e., latitude and longitude) of the host window;

$\text{ORIENT}_{win}$ represents the orientation of the host window;

t is the time of the day;

n is the day of the year; and $B_{ext}$ is the brightness of daylight incident on the exterior surface of the window.

The specific meanings of $\text{Setting}_{wc}$, $I_{desired}$, and $\text{DESIGN}_{wc}$ will vary with specific embodiments of the subject invention. Moreover, for many embodiments, these will not be scalar variables or constants, but instead will be multi-dimensional quantities.

Parameters vs. Variables

The arguments of function $f_{regulate}$ can be grouped into two categories: variables, which will vary over the course of operation of a particular daylighting system, and parameters, which will remain fixed for a given installation of that system. In addition, as will be seen, one of the arguments may be considered either a variable or parameter, depending on the specific embodiment of the subject invention.

VARIABLES

In all embodiments of the subject invention, time of the day t, day of the year n, and external brightness $B_{ext}$ will vary over the course of operation, and can thus be considered variables.

PARAMETERS

In virtually all embodiments of the subject invention, design characteristics of the window covering $\text{Design}_{wc}$, geographic location $\text{Loc}_{win}$ of the host window, and orientation $\text{Orient}_{win}$ of the window will be fixed over the course of operation, and can thus be considered parameters.

CONDITIONAL VARIABLE

Depending on the specific embodiment, the desired characteristics of the admitted illumination $I_{desired}$ can be considered either a parameter or a variable. In some cases, $I_{desired}$ will be fixed after installation; in other cases, it will be desirable to have the capability to vary $I_{desired}$ during operation.

Practical Implementation of Function $f_{regulate}$

As will be apparent to those skilled in the art, function $f_{regulate}$ will generally embody transcendental relationships, and will often have a substantial overall mathematical complexity. Accordingly, real-time evaluation of function $f_{regulate}$ (e.g., by control unit 11 of system 10) could entail substantial software complexity.

However, the complexity of the required software operations can be reduced through two measures:
- exploiting the fact that the parameters of $f_{regulate}$ will not change over the course of operation of the subject invention, so that only the effects of changes in the variables need be considered during operation; and
- using table look-up or mathematical modeling techniques to further simplify the calculation of $Setting_{wc}$ as a function of the salient variables.

OPERATING FUNCTION SENSITIVE ONLY TO VARIABLES

In most cases, implementation of $f_{regulate}$ would be facilitated if the number of arguments could be reduced.

This can be accomplished, for specific embodiments of the subject invention, by first identifying parameters and variables from among the seven arguments of $f_{regulate}$.

Then, holding the parameters of $f_{regulate}$ fixed to the appropriate values for a given embodiment and installation, a new operating function $f_{operate}$ can be defined, such that the arguments of $f_{operate}$ consist solely of the variable arguments of $f_{regulate}$, and such that the functions $f_{operate}$ and $f_{regulate}$ yield the same values of $Setting_{wc}$ for the same values of the variable arguments.

This new operating function $f_{operate}$ thus provides a simpler relationship between $Setting_{wc}$ and the salient variables, valid for that embodiment and installation.

Generic Operating Function

As previously stated, in many embodiments of the subject invention, $Design_{wc}$, $Loc_{win}$, and $Orient_{win}$ will be fixed over the course of operation, and can be considered parameters. These can be held fixed, and $f_{regulate}$ evaluated to define another function $f_{operate}$, such that:

$$Setting_{wc} = f_{operate}(I_{desired}, t, n, B_{ext}).$$

Operating Function With Effects of $I_{desired}$ and $B_{ext}$ Incorporated in a Single Argument In some embodiments, it will be possible to simplify $f_{operate}$ by capturing the effects of $I_{desired}$ and $B_{ext}$ in a single argument.

For example, in many applications it will be desired to maintain a predetermined brightness $B_{desired}$ of the admitted illumination. In this case, then, the scalar brightness $B_{desired}$ can be substituted for the generic argument $I_{desired}$.

For many types of window coverings, the required setting to achieve a certain admitted brightness will be a function of the ratio of the desired brightness to the external, incident brightness. Thus, under the conditions cited above, the desired setting will be a function of the ratio of $B_{desired}$ to $B_{ext}$. This enables a new operating function $f_{ratio}$ to be defined, such that:

$$Setting_{wc} = f_{ratio}(t, n, R_b),$$

where
$R_b$ is the ratio of $B_{desired}$ to $B_{ext}$

Operating Function With Fixed $I_{desired}$

In some embodiments (such as the preferred embodiment, which will be subsequently described), the desired characteristics of the admitted illumination $I_{desired}$ will be fixed over the operation of the subject invention. By holding $I_{desired}$ constant, another, yet simpler, operating function $f_{fixed}$, can be defined, such that:

$$Setting_{wc} = f_{fixed}(t, n, B_{ext}).$$

Operating Function Without $B_{ext}$

In some embodiments (such as the preferred embodiment, which will be subsequently described), the overall operation can be considerably simplified by treating the effects of the external brightness $B_{ext}$ separately from the other variables. For example, in the preferred embodiment, variable $B_{ext}$ has a binary effect on the $Setting_{wc}$: when $B_{ext}$ exceeds a predetermined threshold, the value of $Setting_{wc}$ is held constant; when $B_{ext}$ is less than the threshold, the value of $Setting_{wc}$ is established according to an the operating function $f_{preferred}$, such that:

$$Setting_{wc} = f_{preferred}(t, N).$$

Alternative Forms

Many other forms of $f_{operate}$ can also be used. Some of the seven arguments of $f_{regulate}$ may not appear as explicit arguments of particular forms of $f_{operate}$. However, in all cases, each of the seven arguments of $f_{regulate}$ nevertheless influences the required setting $Setting_{wc}$ of the window covering. Thus, all seven arguments of function $f_{regulate}$ are present, either explicitly or implicitly, in functions $f_{operate}$ according to the subject invention.

USE OF TABLE LOOK-UP OR MATHEMATICAL MODELS TO IMPLEMENT OPERATING FUNCTION

The implementation of the operating function can be further simplified through use of table look-up or mathematical modeling techniques.

Table Look-Up Techniques

The control function (e.g., function $f_{operate}$) could be mathematically evaluated each time the required setting $Setting_{wc}$ of the window covering must be determined. An alternative approach, however, is to pre-evaluate the operating function for discrete values of each of the salient variables prior to operation of the window covering, and to store the resulting values of $Setting_{wc}$ in a look-up table. Then, during operation of the window covering, the required value of $Setting_{wc}$ can be determined by simply reading the look-up table. This approach reduces the complexity of the computations required during operation of the window covering, but requires a larger memory within control unit 11 to store the pre-evaluated values of $Setting_{wc}$. For current technologies, this is a favorable trade-off, and the table look-up approach is used in the preferred embodiment.

Mathematical Modeling Techniques

Another alternative approach also involves pre-evaluation of the operating function for discrete values of the salient variables (as described above). However, instead of storing the resulting values of $Setting_{wc}$ in a look-up table, the values are analyzed (e.g., using curve-fitting techniques) to identify a relatively simple mathematical model which accurately represents $Setting_{wc}$ as a function of the salient variables. The advantages and disadvantages of this approach are discussed further elsewhere in this disclosure.

OPERATION OF THE PREFERRED EMBODIMENT

Figure 3:
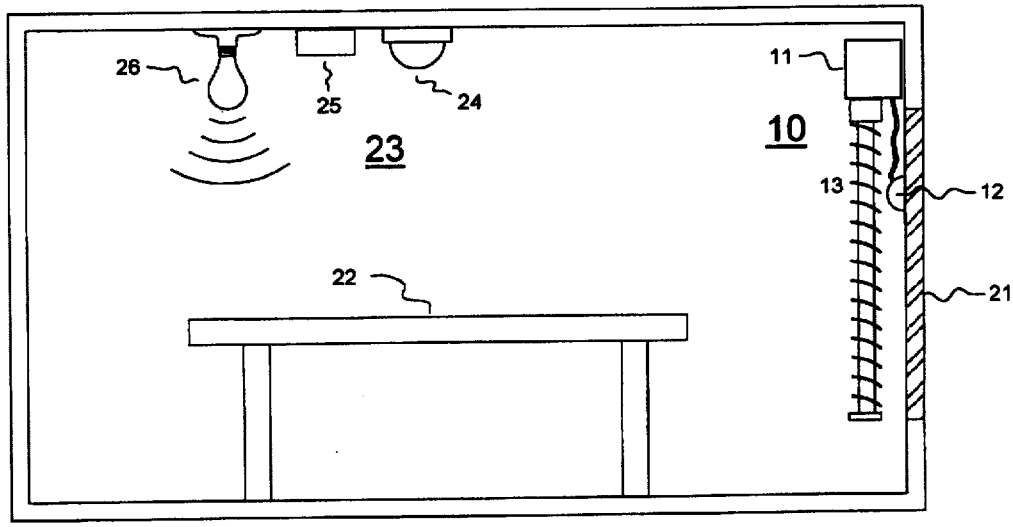
FIG. 3 is an illustration of a typical installation of the preferred embodiment.

FIG. 3: Typical Installation

FIG. 3 depicts a typical installation of system 10. System 10 is installed on a host window 21, near which is located a desk 22.

Also within the room is an automatic, adaptive lighting system 23, which is a conventional system capable of adjusting the light output of an electric lamp to maintain a constant workplane illuminance (i.e., brightness at the surface of desk 22), as sensed by an illuminance sensor 24. Lighting system 23 comprises illuminance sensor 24, a control unit 25, and a lamp 26. Many such systems are known in the art, including:

the automatic energy control lighting system shown in U.S. Pat. No. 4,009,387 to Nuver (1977);

the constant illumination control system shown in U.S. Pat. No. 4,135,116 to Smith (1979);

the equi-visibility lighting control system shown in U.S. Pat. No. 4,273,999 to Pierpoint (1981); and the lighting control system with priority override shown in U.S. Pat. No. 5,357,170 to Luchaco (1994).

In addition, such systems are commercially available (e.g., the Daylight Harvesting System manufactured by Electronic Lighting Incorporated, of Menlo Park, Calif.). Any one of these would be suitable for the installation of FIG. 3.

However, the presence of such a system is not necessary for useful application of system 10; as will be discussed subsequently, system 10 would provide significant benefits even without the presence of system 23.

FIG. 3: General Operating Concept

The operating concept of the preferred embodiment of system 10 is based on two simplifying assumptions:

direct solar radiation (i.e., radiation which travels a line-of-sight path from the solar disk) admitted into an interior space is a prime cause of glare, and if direct solar radiation is blocked—allowing only diffuse daylight to be admitted—then the intensity of the admitted daylight can vary over a relatively wide range without causing visual discomfort.

These assumptions are often made in the art (for example, they effectively constitute the basis for the aforementioned glare-blocking systems of Riehl, Nebhuth, and Kern). The assumptions have proven to be generally valid, and enable a considerable simplification in the software operation of the preferred embodiment of system 10.

Accordingly, in the preferred embodiment, system 10 operates to maintain a desired characteristic of admitted illumination $I_{desired}$ such that the presence of direct solar radiation is minimized, while the presence of diffuse illumination is maximized.

System 10 achieves this object by maintaining a tilt angle of the louvers of motorized venetian blind 17 which will block direct solar radiation, while admitting diffuse daylight (and no action is taken to regulate the intensity of the admitted daylight). This operation is performed in open-loop fashion, without directly measuring the angle of incidence of direct solar radiation or the brightness of the interior illumination. Thus, no AOI sensor or interior-mounted illuminance sensor is required.

At the same time, adaptive lighting system 23 operates in a closed-loop fashion (via feedback from illuminance sensor 24) to maintain a predetermined illuminance at the surface of desk 22. There is no connection between system 10 and lighting system 23; the operation of the systems is completely independent. In effect, system 10 operates to admit as much glare-free daylight as possible, while system 23 provides only enough artificial illumination—beyond the natural illumination provided by system 10—to maintain a desired workplane illuminance. Therefore, the combination of system 10 and system 23 provides the maximum possible savings in the energy used for artificial illumination, without need for any physical connection between the systems.

As will be subsequently described, alternative embodiments of system 10 can also (with appropriate software modifications) be made to regulate the intensity of the admitted diffuse daylight, in addition to blocking the admission of direct solar radiation.

FIG. 4: Flowchart of High-Level Software Operation

FIG. 4 shows a flowchart of the high-level software operation of the preferred embodiment of system 10.

Software steps 27 and 28

The software operation begins with a software step 27, in which microcontroller 14 determines the current exterior brightness by registering the output of brightness sensor 12.

Then, in a software step 28, the software operation is branched to one of the branches, depending on the exterior brightness determined in step 27.

Software step 29

If the exterior brightness determined in step 27 is less than a first predetermined threshold, then a software step 29 is executed. The purpose of step 29 is to react to the absence of daylight; accordingly, the first predetermined threshold represents a relatively low level of exterior brightness, (e.g., as would be the case at dusk).

In step 29, microcontroller 14 actuates electronically controlled window covering 13 to a predetermined nighttime setting. This will typically be a setting which blocks the view into, or out of, the host window, thereby maintaining privacy. In venetian blind 17 of the preferred embodiment, such a setting is achieved by tilting the venetian blind louvers to a near-vertical orientation.

Software step 30

If the exterior brightness determined in step 27 is between the first predetermined threshold and a second predetermined threshold, then a software step 30 is executed. The purpose of step 30 is to react to the presence of diffuse daylight in the absence of direct solar radiation (e.g., as would be the case on an overcast day, or on a clear day with a north-facing window). Accordingly, the second predetermined threshold represents a moderate level of exterior brightness, corresponding to the maximum expected brightness in the absence of direct solar radiation.

In step 30, microcontroller 14 actuates electronically controlled window covering 13 to a predetermined setting which admits a substantial quantity of diffuse illumination, and which provides a good view out of the window. This will typically be a setting which provides the maximum transmissivity or effective aperture area of window covering 13. In venetian blind 17 of the preferred embodiment, such a setting is achieved by tilting the venetian blind louvers to a near-horizontal orientation.

Software Step 31

If the exterior brightness determined in step 27 is greater than the second predetermined threshold, then a software step 31 is executed. The purpose of step 31 is to enable the system react to the presence of direct solar radiation (e.g., as would be the case on clear day in the morning, with a an east-facing window).

In step 31, microcontroller 14 actuates electronically controlled window covering 13 to a predetermined setting which blocks direct solar radiation, but which still admits a substantial quantity of diffuse illumination. The setting of venetian blind 17 required to achieve this condition is described in detail in the following paragraphs.

Periodic Looping of Software Operation

As shown in FIG. 4, step 27 is repeated after completion of steps 29, 30, or 31. This repetition constitutes the major loop of the software operation. In the preferred embodiment, the frequency of this repetition is five minutes, but this value is not critical and some experimentation or analysis will be required to determine the optimum interval for each application.

Summary of High-Level Software Operation

Thus, it can be seen that the software operation of the preferred embodiment includes three modes, with the mode selection automatically made on the basis of the level of exterior brightness. The first mode (comprising step 29) is operative at night-time; the second mode (comprising step 30) is operative during day-time when direct solar radiation is absent, and the third mode (comprising step 31) is operative during day-time when direct solar radiation is present.

Practitioners in the art will recognize similarities between the operations depicted in FIG. 4, and those performed in prior-art systems. In particular, the selection of different operating modes on the basis of the level of exterior brightness is a feature of certain prior-art automatic window covering systems. For example, systems are known which can automatically actuate a window covering to fixed, predetermined settings at dawn and at dusk. The system shown in U.S. Pat. No. 5,413,161 to Corazzini, and the system shown in my aforementioned co-pending application, Ser. No. 08/505,845, are example of such systems.

In particular, my aforementioned co-pending application describes in detail the software operations and hardware associated with sensing the level of exterior brightness, and automatically actuating a venetian blind to predetermined settings as a function of the sensed brightness. Therefore, these operations will not be described further in this specification.

Automatic actuation of a window covering to block direct solar radiation while admitting diffuse daylight—as is performed in step 31—is also an object of certain prior-art systems, including the aforementioned systems of Riehl, Nebhuth, and Kern. However, as previously described, system 10 achieves this object without need for a sun-tracking sensor or solar Angle-Of-Incidence (AOI) sensor (as required in the prior-art systems). This requires certain unconventional operations associated with step 31. These operations are described in detail in the following paragraphs, along with the background necessary to understand and apply the techniques.

Illumination Control With Venetian Blinds

FIG. 5A: Venetian Blind Configuration

As previously stated, the preferred embodiment of system 10 includes a conventional venetian blind 17. As shown in FIG. 5A, blind 17 includes an array of louvers 32. Louvers 32 can be tilted, in unison, to an angle $\theta_{tilt}$ with respect to the horizontal. Variation in this angle $\theta_{tilt}$ is the mechanism for modulation of the admitted illumination. Accordingly, in the preferred embodiment, the aforementioned desired setting Setting$_{wc}$ corresponds to a particular value of $\theta_{tilt}$.

For a given venetian blind, the maximum and minimum values $\theta_{tilt}$ are established by characteristics of the blind design; for a typical blind, $\theta_{tilt}$ can range from −80 degrees to +80 degrees (with respect to the horizontal). The values of maximum tilt and minimum tilt are hereinafter referred to as $\Theta_{tiltmax}$ and $\Theta_{tiltmin}$.

Components of Admitted Illumination

The illumination admitted by a venetian blind under typical circumstances can be resolved into three primary components:

A. $I_{direct}$ (not shown), or direct radiation from the solar disk which passes straight through blind 17 between louvers 32;

B. $I_{indirect}$ (not shown), or indirect radiation from the solar disk which does not pass straight through blind 17, but which is instead admitted via reflection from the surfaces of louvers 32; and C. $I_{diffuse}$ (not shown), or diffuse illumination (including both sky and ground-reflected components) passing between louvers 32.

As is known in the art, the direct solar component $I_{direct}$—when present—typically dominates the total admitted illumination, and is a primary source of glare. However, $I_{direct}$ is present only in sunny weather and for certain relative positions of the sun; moreover (as will be described subsequently), it can be blocked by an appropriate adjustment of the tilt angle $\theta_{tilt}$ of louvers 32. This action is performed automatically in the preferred embodiment of system 10.

The diffuse component $I_{diffuse}$ is the second-largest component of the admitted illumination. $I_{diffuse}$ will often be great enough to eliminate the need for artificial illumination near the window. In addition, due to its inherently non-directional nature and low intensity (relative to $I_{direct}$), $I_{diffuse}$ is less likely to produce glare. Thus, $I_{diffuse}$ is generally the most useful component for daylighting purposes. As will be subsequently described, the intensity of $I_{diffuse}$ can be regulated by adjustment of the tilt angle $\theta_{tilt}$ of louvers 32. However, in most cases such regulation will not be necessary, and is not performed in the preferred embodiment of system 10 (however, it can be effected in alternative embodiments of the subject invention, as will be subsequently described).

The maximum relative intensity of the indirect component $I_{indirect}$ is strongly influenced by the surface reflectance, as well as the orientation, of louvers 32; however, $I_{indirect}$ is typically much smaller than $I_{diffuse}$. Also, like $I_{diffuse}$, $I_{indirect}$ is considerably less likely to cause glare than is the direct solar component $I_{indirect}$. The intensity of $I_{indirect}$ can be regulated by adjustment of the tilt angle $\theta_{tilt}$ of louvers 32. However, in most cases such regulation will not be necessary, and is not performed in the preferred embodiment of system 10.

Thus, adjustment of the tilt angle $\theta_{tilt}$ of louvers 32 can be used to block the primary cause of glare (i.e., the direct solar component $I_{direct}$), and also to regulate the intensity of the other components (i.e., the diffuse component $I_{diffuse}$ and the indirect component $I_{indirect}$). In the preferred embodiment of system 10, the direct component $I_{direct}$ is automatically blocked, while the other components are admitted without any attempt to regulate their intensity.

FIGS. 5B to 5D: Blocking of Direct Solar Component $I_{direct}$

Referring now to FIG. 5B, it is evident that, for any given solar angle of incidence $\theta_i$, $I_{direct}$ will be blocked by louvers 32 when the louver tilt is less than an angle $\psi_{min}$. From FIG. 5C, it is also evident that, for the same angle of incidence $\theta_i$, $I_{direct}$ will be blocked by louvers 32 when the louver tilt is greater than an angle $\psi_{max}$. Thus, for a given angle of incidence $\theta_i$, $I_{direct}$ will pass straight through louvers 32 when the louver tilt is between $\psi_{min}$ and $\psi_{max}$, and will be blocked by louvers 32 for values of $\theta_{tilt}$ outside this range.

The angles $\psi_{min}$ and $\psi_{max}$ are hereinafter referred to as the critical angles, and the angular range between $\psi_{min}$ and $\psi_{max}$ as the critical range.

It can be shown that the critical angles $\psi_{min}$ and $\psi_{max}$ are functions of the incidence angle $\theta_i$, with the ratio of the louver center-to-center vertical spacing S to the louver width W (shown in FIG. 5B) as a parameter. FIG. 5D shows the critical angles $\psi_{min}$ and $\psi_{max}$ plotted as a function of $\theta_i$, for a typical venetian blind having an S/W ratio of 0.74.

FIG. 5D: Operation Above or Below Critical Range

As previously indicated, $I_{direct}$ can be blocked by louver tilt angles which are either above or below the critical range. In the preferred embodiment, the louver tilt angle $\theta_{tilt}$ is kept below the critical range (i.e., below the $\psi_{min}$ curve of FIG. 5D). This is because—at high values of solar incidence $\theta_i$—operation above the critical range results in a required louver tilt angle $\theta_{tilt}$ which can approach, or exceed, the maximum tilt value $\Theta_{tiltmax}$ (e.g., 80 degrees for a typical blind). On the other hand, operation below the critical range approaches neither $\Theta_{tiltmax}$ nor $\Theta_{tiltmin}$.

FIG. 5D: Preferred Tilt Angle vs. Incidence Angle for Daylighting Applications

With respect to FIG. 5D, the preferred relationship between the louver tilt angle $\theta_{tilt}$ and the solar incidence angle $\theta_i$ for the preferred embodiment of system 10 is now described.

As previously stated, the preferred embodiment of system 10 maintains a value of louver tilt $\theta_i$ which blocks the direct solar component $I_{direct}$, while admitting the indirect and diffuse components $I_{indirect}$ and $I_{diffuse}$. Also as previously stated, the operating concept for the preferred embodiment calls for admission of the maximum amount of glare-free natural illumination; accordingly, it is desirable to maintain a tilt angle $\theta_{tilt}$ which will maximize the sum of $I_{indirect}$ and $I_{diffuse}$.

However, the calculation of the value of $\theta_{tilt}$ required to maximize the sum of $I_{indirect}$ and $I_{diffuse}$ is complex, and depends on variables other than the incidence angle $\theta_i$. For example, it depends on the angular distribution of the diffuse illumination incident on the window (which, in turn, depends on factors such as the weather, the reflectance of the ground, and the proximity of terrestrial structures). Although such a calculation could be performed in the operation of system 10, no such calculation is performed in the operation of the preferred embodiment. Instead, a fixed operating curve $\theta_{tilt}=f_{tilt}(\theta_i, S/W)$, shown in FIG. 5D, is used. Function $f_{tilt}$ expresses the desired louver tilt angle $\theta_{tilt}$ as a function of the solar incidence angle $\theta_i$ and louver vertical-spacing-to-width ratio S/W. Function $f_{tilt}$ provides very good daylighting performance, while substantially simplifying the operation of system 10.

The curve $\theta_{tilt}=f_{tilt}(\theta_i, S/W)$ calls for a louver tilt angle which is the lesser of two values:

$\psi_{min}$, less a first predetermined, fixed value; and a second predetermined, fixed value, typically zero.

While the curve $\theta_{tilt}=f_{tilt}(\theta_i, S/W)$ will not necessarily maximize the sum of $I_{indirect}$ and $I_{diffuse}$ as described above, it will—in most circumstances—result in an illumination intensity which is sufficiently close to the maximum. Moreover, the curve $\theta_{tilt}=f_{tilt}(\theta_i, S/W)$ can be readily implemented with a simple hardware and software embodiment.

In the curve $\theta_{tilt}=f_{tilt}(\theta_i, S/W)$, the aforementioned first fixed value (i.e., the negative offset with respect to $\psi_{min}$) provides a margin to ensure that the direct solar component $I_{direct}$ is blocked in the face of possible uncertainties in the solar incidence angle $\theta_i$ or the louver tilt angle $\theta_{tilt}$. In the preferred embodiment, the first predetermined value is five degrees.

The aforementioned second predetermined fixed value allows the admission of a substantial fraction of the incident diffuse illumination, while also ensuring a good view through the window. In most cases, this second predetermined value will be zero (i.e., denoting a horizontal orientation of the louvers); this will maximize the effective aperture of the venetian blind while providing the best view in a direction normal to the plane of the window. However, for windows located at elevations substantially above ground level, this second predetermined value may be slightly less than zero to improve the view in a downward direction. In this case, the optimum value will depend on factors such as the displacement between window 21 and desk 22, as well as the elevation of window 21. In practice, this value will be determined subjectively during the installation of system 10. However, a value of zero will be good choice for most applications, and is used in the preferred embodiment.

In summary, the preferred embodiment of system 10 operates to maintain the louver tilt angle $\theta_{tilt}$ as a function of the solar incidence angle $\theta_i$, according to the curve $\theta_{tilt}=f_{tilt}(\theta_i, S/W)$ of FIG. 5D.

FIG. 5E: Determination of Solar incidence Angle

In order to implement the function $\theta_{tilt}=f_{tilt}(\theta_i, S/W)$ shown in FIG. 5D, the solar incidence angle $\theta_i$ must be known. In prior-art systems, the solar angle of incidence is measured directly via an AOI sensor. Alternatively, however, the angle of incidence of direct solar radiation on a window can be inferred from other variables, and this is the approach used in the subject invention.

As is known in the art, the angle of incidence of direct solar radiation on a window can be expressed as a function of:

time t;

the current day of the year n;

the local geographic location $LOC_{win}$, and specifically the local latitude $\lambda$ and longitude $L_{local}$; and the orientation $ORIENT_{win}$, and specifically the azimuth orientation $\phi_{window}$ for vertical windows, or both the azimuth orientation $\phi_{window}$ and the elevation orientation $\theta_{window}$ for windows which are inclined from the vertical.

The calculation of solar incidence angle as a function of these variables is straightforward and is given in many texts; see, for example, Kreider, Jan F. and Ari Rabl (1994), *Heating and Cooling of Buildings*, McGraw-Hill, New York, section 6.1.

As an example, FIG. 5E shows a plot of the solar incidence angle $\theta_i$ Vs time t, for three different days of the year (n=1, n=91, and n=181, where n=1 represents January 1), for a latitude $\lambda$ and longitude $L_{local}$ corresponding to Washington, D.C., and for a southwestern window orientation ($\phi_{window}$=45 degrees).

The function which relates the solar incidence angle $\theta_i$ to the aforementioned variables will hereinafter be referred to as $f_{solar}$, such that:

$$\theta_i = f_{solar}(t, n, \lambda, L_{local}, \phi_{window})$$

It should be emphasized that the value of $\theta_i$ obtained by evaluating function $f_{solar}$ is all inferred value, and represents the solar angle of incidence which would be expected if direct solar radiation were present. In practice, factors such as clouds and terrestrial objects could block direct solar radiation, rendering the value of $\theta_i$ meaningless; in addition, errors in the variables of function $f_{solar}$ could cause the expected value $\theta_i$ to differ from the actual value. However, these factors can be easily accounted for in the operation of system 10, as will be subsequently described. Therefore, function $f_{solar}$ is a reliable basis for inferring the solar angle of incidence $\theta_i$.

Summary of Required Mathematical Operations For Control of Venetian Blind 17

As previously stated, two mathematical functions are required to define the operating tilt angle $\theta_{tilt}$ for the preferred embodiment of system 10:

$\theta_{tilt}=f_{tilt}(\theta_i, S/W)$, an example of which is depicted in FIG. 5D; and $\theta_i=f_{solar}(t, n, \lambda, L_{local}, \phi_{window})$, an example of which is depicted in FIG. 5E.

COMPOSITE REGULATION FUNCTION

These functions can be combined to yield a third function $f_{composite}$ such that:

$$\theta_{tilt}=f_{composite}(t, n, \lambda, L_{local}, \phi_{window}, S/W).$$

The function $f_{composite}$ thus defines the desired louver tilt angle as a function of time and day, for the geographic location and orientation of the host window and for the louver vertical spacing-to-width ratio of blind 17, for operation of the preferred embodiment of system 10.

RELATIONSHIP BETWEEN $F_{COMPOSITE}$ AND $F_{REGULATE}$

Via comparison, it can be seen that $f_{composite}$ represents a specific case of the previously described general control function $f_{regulate}$. It is apparent that the S/W ratio of $f_{composite}$ corresponds to the parameter $DESIGN_{wc}$ of $f_{regulate}$.

However, the desired characteristic of the admitted illumination $I_{desired}$ is an explicit argument of $f_{regulate}$, but does not appear in $f_{composite}$. This is because $I_{desired}$ of the preferred embodiment is not a variable, but represents a fixed characteristic (i.e., minimum direct solar radiation with maximum diffuse illumination). The fixed characteristic represented by $I_{desired}$ is thus incorporated in the form of $f_{composite}$ (via the function $f_{tilt}$), so there is no need to include it as an explicit argument.

OPERATING FUNCTION $F_{PREFERRED}$

In the function $f_{composite}$, it is evident that only the time t and the day n are time-dependent variables; the latitude $\lambda$, longitude $L_{local}$, and window azimuth orientation $\phi_{window}$ are fixed parameters which are dependent on the location and orientation of window 21, while the louver vertical spacing-to-width ratio S/W is fixed for the design of blind 17. Thus, for installation of system 10 on a particular window (or a group of windows on the same facade of a building), the function $f_{composite}$ need be evaluated only with respect to the variables t and n; the parameters $\lambda$, $L_{local}$, $\phi_{window}$, and S/W can be held constant to the values appropriate for the location and orientation of the host window(s).

This can be achieved by holding these parameters constant (to the values appropriate for the specific instances of window 21 and blind 17), and evaluating $f_{composite}$ to define function $f_{preferred}$, such that:

$$\theta_{tilt}=f_{preferred}(t, N).$$

It is apparent that, while the parameters $\lambda$, $L_{local}$, $\phi_{window}$, and S/W, do not appear explicitly in the arguments of function $f_{preferred}$, their effects are included implicitly. Also, while variable $B_{ext}$ does not appear as an argument of function $f_{preferred}$, its effects are included elsewhere in the operation of the preferred embodiment, as will be described subsequently.

Implementation of Venetian Blind Control Function $f_{preferred}$ via Table Look-Up Using NVM 16

Although the function $f_{preferred}$ could be periodically evaluated in real time within control unit 11, such a real-time evaluation would entail significant software complexity and would require a relatively powerful computing element. In the preferred embodiment, the function $f_{preferred}$ is not evaluated within system 10. Instead, data representing the evaluation of function $f_{preferred}$—over the full range of expected values of the pertinent variables—is stored within NVM 16 prior to initial usage of system 10. Thereafter, the required tilt angle $\theta_{tilt}$ is determined via a table look-up operation and linear interpolation of the stored data. This considerably simplifies the required software and hardware. For this reason, the look-up table approach is also used in many commercially available systems, such as automotive electronic fuel injection and ignition systems (in which the desired fuel injector pulse duration and ignition advance, for example, are stored as functions of variables such as the intake manifold pressure, engine RPM, and temperature).

The look-up table could be generated (and stored within NVM 16) at the time of installation of system 10 by means of a portable computer (e.g., a laptop computer); this is the approach used in the preferred embodiment. Alternatively, the look-up table could be generated and stored within NVM 16 at the time of manufacture or final assembly of system 10.

FIG. 5F: Configuration of NVM 16

Referring now to FIG. 5F, NVM 16 accepts an address word A, and either reads or writes a data word D. In the preferred embodiment, address word A represents the variables t and n, while data word D represents the corresponding desired louver tilt angle $\theta_{tilt}$ (as defined by the function $f_{preferred}$). The values of the variables t and n are derived from real-time clock/calendar 15, while the desired louver tilt angle $\theta_{tilt}$ is registered by microcontroller 14.

In the preferred embodiment, NVM 16 is a serial EEPROM of 1024 bytes capacity. This size was selected because it provides adequate accuracy (e.g., fidelity of representation of function $f_{preferred}$) at relatively low cost. No attempt has yet been made to establish the minimum required capacity of NVM 16; it is possible that considerably smaller capacities would be viable (however, in view of the rapid pace of development of non-volatile memory technologies, there may be little need to further minimize the size of NVM 16). The following paragraphs describe how function $f_{preferred}$ can be represented with adequate fidelity within such a small memory capacity.

Required Size of NVM 16 Determined by Dynamic Range and Resolution of time T and day N The required size of NVM 16 is determined by the number of bits of address word A, which, in turn, is determined by the desired dynamic range and resolution of the variables t and n.

REQUIRED DYNAMIC RANGE

The maximum dynamic ranges of variables t and n are evidently 24 hours and 365 days, respectively. However, since system 10 need operate only during the daylight hours, the dynamic range of t can be reduced to a convenient value which is larger than the maximum expected number of hours between sunrise and sunset. In the preferred embodiment, this is 16 hours.

REQUIRED RESOLUTION

In the preferred embodiment, the size of NVM 16 is minimized by taking advantage of the fact that the function $f_{preferred}$ is approximately linear for small changes in the variables t and n. Thus, a relatively coarse resolution for these variables can be used, with linear interpolation to provide the desired accuracy.

The resolutions used in the preferred embodiment were established empirically. These resolutions are 15 minutes for t, and 23 days for n. This provides 64 sample points for t over the 16-hour dynamic range, and 16 sample points of n over the 365-day dynamic range, for a total memory size of 16*64 or 1024 bytes.

However, while these resolutions provide adequate accuracy, they are not necessarily optimum; further analysis and experimentation would be required to establish the optimum resolutions.

use of linear INTERPOLATION

As previously stated, address word A can have 1024 possible values, with each value representing a particular time t and day n. As discussed above, the preferred embodiment uses relatively coarse resolutions for the variables t and n (15 minutes and 23 days, respectively), in order to define the full range of $f_{preferred}$ within the available memory capacity. However, these resolutions are too coarse for proper operation of system 10 without interpolation of the data stored in NVM 16.

Therefore, a conventional four-point linear interpolation is used to find the value of louver tilt $\theta_{tilt}$ for an arbitrary time $t_a$ and day $n_a$ which fall between the discrete values of t and n represented by adjacent address words A. This method comprises five steps:

First, the two values of the discrete variable t which bound the arbitrary value $t_a$ are identified. These two discrete values of t are denoted as $t_L$ and $t_u$, such that $t_L < t_a < t_u$, with $t_L$ and $t_u$ being multiples of the resolution of variable t (i.e., 15 minutes).

Next, the two values of the discrete variable n which bound the arbitrary value $n_a$ are identified. These two discrete values of n are denoted as $n_L$ and $n_u$, such that $n_L < n_a < n_u$, with $n_L$ and $n_u$ being multiples of the resolution of variable n (i.e., 23 days).

Two values of louver tilt $\theta_1=f_{preferred}(t_L, n_L)$ and $\theta_2=f_{preferred}(t_u, n_L)$ are then read from NVM 16, and a louver tilt value $\theta_{inter.1,2}=f_{preferred}(t_a, n_L)$ is estimated via linear interpolation between the values $\theta_1$ and $\theta_2$.

Two values of louver tilt $\theta_3=f_{preferred}(t_L, n_u)$ and $\theta_4=f_{preferred}(t_u, n_u)$ are then read from NVM 16, and a louver tilt value $\theta_{inter.3,4}=f_{preferred}(t_a, n_u)$ is estimated via linear interpolation between the values $\theta_3$ and $\theta_4$.

Finally, the desired louver tilt value $\theta_{tilt}=f_{preferred}(t_a, n_a)$ is estimated via linear interpolation between the values $\theta_{inter.1,2}$ and $\theta_{inter.3,4}$.

Many other methods of linear and non-linear interpolation are known, and any of these may be instead of the method described above. Those skilled in the art will recognize that interpolation may not be necessary if NVM 16 has a sufficiently large capacity to permit storing of the data with the desired resolution.

FIG. 5G: Software Operations for Software Step 31

As previously shown in FIG. 4, step 31 causes electronically controlled window covering 13 to be automatically adjusted to a predetermined setting which blocks direct solar radiation, but which still admits a substantial quantity of diffuse illumination. Mathematical and other background information related to step 31, for venetian blind 17 of the preferred embodiment, were given in the previous paragraphs.

With this background information, step 31 can be described in more detail for the preferred embodiment. FIG. 5G shows a lower-level decomposition of the software operations required in step 31.

First, a step 31A is performed, in which microcontroller 14 performs a 4-point interpolation on the data stored in NVM 16 (as previously described) to find the desired value of louver tilt $\theta_{tilt}$ according to the function $f_{preferred}$.

Next, a step 31B is performed, in which microcontroller 14 actuates motor 18, via switch array 19, to tilt louvers 32 to the desired value of louver tilt $\theta_{tilt}$ as sensed by position feedback sensor 20. The operations required in step 31B are very similar to those used in any digitally controlled servopositioning system. For example, they are described in detail in my aforementioned co-pending application (Ser. No. 08/505,845).

Considerations in Programming of NVM 16

Two operations must be performed to ready NVM 16 for use: calculation of the data to be stored in NVM 16, and actual programming of the data within NVM 16. As previously stated, these operations can be performed at the time of installation of system 10, or during manufacture of system 10.

Calculation of Data For Storage In NVM 16

Since the data to be programmed in NVM 16 will depend on the location $LOC_{win}$ and orientation $ORIENT_{win}$ of window 21, as well as the ratio of louver vertical spacing S to width W of blind 17, different data must be generated for each unique combination of these parameters.

The mathematical operations for calculation of data (i.e., desired values of $\theta_{tilt}$ as a function of time t and day n, according to function $f_{preferred}$) can be performed in a known manner in accordance with the information presented herein. These calculations could be readily performed in a personal computer. In the preferred embodiment, they are performed in a portable laptop computer (not shown) which has a commercially available Global Positioning System (GPS) receiver card to establish the geographic location $LOC_{win}$, as well as a commercially available flux-gate compass module to establish the window orientation $ORIENT_{win}$. These parameters could also be entered manually, of course, or obtained electronically from other sources (such as computer-based architectural drawings for the host building).

Programming

The optimum approach for programming NVM 16 will depend on the application. If each window of a very large building is to be equipped with system 10, then the optimum approach is to program each instance of NVM 16 at the factory, using high-volume programming equipment. This is an attractive approach because all windows on a particular face of a building share the same location and orientation; thus, if the venetian blinds used on these windows also share the same S/W ratio, then the values of $\theta_{tilt}$ according to function $f_{preferred}$ will also be the same for all the windows. Therefore, the number of unique instances of NVM 16 for an entire building will be no greater than the number of building faces (typically four).

On the other hand, if a relatively small number of windows is to be equipped with instances of system 10, then the optimum approach will generally be to program NVM 16 at the time of installation of system 10. This can be easily accomplished by connecting a commercially available programmer to the aforementioned portable laptop computer. This is the approach taken in the preferred embodiment.

Summary of Operation of the Preferred Embodiment

It was shown in FIG. 4 that system 10 causes electronically controlled window covering 13 to be automatically adjusted to one of three settings, depending on the external brightness $B_{ext}$ as measured by brightness sensor 12:

A. a predetermined, fixed, night-time setting, when the external brightness indicates that no daylight is present (in software step 29);

B. a predetermined, fixed, day-time setting which will admit a substantial quantity of diffuse daylight while simultaneously providing a good view through window 21, when the external brightness indicates that daylight is present without direct solar radiation (in software step 30); and C. a variable setting which will block direct solar radiation while admitting diffuse radiation, when the external brightness indicates that direct solar radiation is present (in software step 31).

For venetian blind 17 of the preferred embodiment, it was shown that the louver tilt angle $\theta_{tilt}$ corresponding to setting C is a function $f_{preferred}$ of the current time t and day n, with the following parameters:

the ratio of louver vertical spacing S to louver width W;

local latitude $\lambda$ and longitude $L_{local}$ of window 21; and azimuth orientation $\phi_{window}$ of window 21.

It was also shown that, while the mathematical calculations required to implement function $f_{preferred}$ can be performed in real time, they are instead performed beforehand (and the resulting values of $\theta_{tilt}$ stored in NVM 16) to provide an extremely practical hardware and software realization of the preferred embodiment of system 10.

ALTERNATIVE EMBODIMENTS

Alternatives to Table Look-Up Approach

The preferred embodiment of system 10 performs a table look-up operation on data pre-stored in NVM 16 to define the desired louver tilt angle $\theta_{tilt}$ as a function of time t and day n, thereby minimizing the need for real-time calculations and simplifying the software operation. However, potentially advantageous alternatives to the table look-up approach exist.

Real-Time Calculation

It will be apparent to those skilled in the art that the above-described mathematical operations could be performed in real-time within microcontroller 14. For such operation, only the geographic location $LOC_{win}$ (i.e., latitude $\lambda$ and longitude $L_{local}$) and orientation $ORIENT_{win}$ of window 21 would have to be stored in NVM 16, thereby greatly reducing its required capacity. However, such operation would greatly increase the complexity of the required software operations. The required software could be developed in accordance with conventional practice, with consideration given to the factors outlined in the preceding discussion.

Hybrid Approach

Alternatively, some portion of the above-described mathematical operations could be evaluated in real-time, with the balance pre-evaluated (and the data stored as a look-up table within NVM 16) as previously described. For example, function $f_{tilt}$ could be pre-evaluated (with the desired louver tilt $\theta_{tilt}$ as a function of the solar incidence angle $\theta_i$, stored in NVM 16). Then, in real-time, the function $f_{solar}$ could be evaluated to determine the solar incidence angle $\theta_i$ for the prevailing time t and day n, and the corresponding desired louver tilt $\theta_{tilt}$ determined via a table look-up operation (and interpolation, if appropriate) on the data stored in NVM 16.

This would reduce the required capacity of NVM 16 relative to the preferred embodiment, while offering a less complex software operation than a purely real-time approach.

Real-Time Operation With Modeled Functions

Another potentially advantageous approach is to pre-evaluate function $f_{preferred}$ with respect to the variables t and n (as previously described in connection with the preferred embodiment), but to then take the additional step of defining a relatively simple mathematical model (e.g., via curve-fitting analysis) which adequately represents the behavior of $f_{preferred}$. For example, such a mathematical model could take the form of a polynomial in the variables t and n, with coefficients dependent on the geographic location $LOC_{win}$ and orientation $ORIENT_{win}$ of window 21, as well as design characteristics $DESIGN_{wc}$ of window covering 13. These coefficients, representing the resulting simplified model of $f_{preferred}$, could then be stored in NVM 16, and the model subsequently evaluated in real-time during operation of system 10.

This approach offers the potential for both a simplified software operation and a greatly reduced memory capacity requirement for NVM 16. However, it may be difficult to develop a simple model which represents $f_{preferred}$ with adequate accuracy (especially in the presence of sharp non-linearities).

Selection Of Optimum Approach

Each of the aforementioned approaches is capable of avoiding the need for a solar AOI sensor (as is required in the prior-art systems). Thus, each approach is potentially capable of enabling an advantageous embodiment of system 10. The optimum approach will depend on the specific circumstances of the application, and can be selected in accordance with standard engineering practice, with consideration given to the factors discussed above.

However, it is evident that, in each approach according to the subject invention, NVM 16 stores data which is dependent at least on the geographic location $LOC_{win}$ and orientation $ORIENT_{win}$ of window 21. Depending on the selected approach, the data stored in NVM 16 may be additionally dependent on the time t, the day n, the design characteristics $DESIGN_{wc}$, the brightness $B_{ext}$, or other parameters and variables as described herein.

Alternative Control Functions

As previously stated, the preferred embodiment implements control function $f_{preferred}$ (previously shown, by way of example, in FIG. 5D) to establish the louver tilt $\theta_{tilt}$ as a function of the prevailing time t and day n, to block the admission of direct solar radiation while admitting substantial diffuse daylight. However, no attempt has yet been made to determine the optimum control function for this purpose, and other control functions may be advantageous in certain applications. Moreover, in some applications it may be desirable to admit direct solar radiation, or to ignore the presence of direct solar radiation and instead regulate some other parameter. And, as will be subsequently discussed, other types of window coverings—instead of venetian blind 17 of the preferred embodiment—could be used in system 10, with each type of window covering potentially requiring a different control function.

It will be evident to those skilled in the art that system 10 is capable of implementing such control functions, or any arbitrary control function in which the desired setting of electronically controlled window covering 13 can be expressed as a function of variables including the exterior brightness, the time of the day t and the day of the year n, the geographic location (i.e., the local latitude $\lambda$ and longitude $L_{local}$), and the window azimuth orientation $\phi_{window}$. This is because these variables determine, to a great extent, the characteristics of the illumination incident on window 22, and—therefore—the characteristics of the admitted illumination for a given setting of window covering 13.

Implementation of an arbitrary control function can be accomplished by defining the control function, evaluating it with respect to the salient variables (time t and day n, and optionally brightness $B_{ext}$ and desired characteristics of admitted illumination $I_{desired}$), and storing the resulting data in NVM 16 for subsequent operation of system 10. The required control function could be developed analytically, in accordance with the information presented in connection with the preferred embodiment, or empirically (as will be described subsequently).

Some possible applications of alternative control functions are described in the following paragraphs.

Minimization Of Energy Consumption

When the subject invention is used in conjunction with an electronically controlled window covering which is operated by solar-charged batteries (such as the system shown in my aforementioned co-pending application, Ser. No. 08/505, 845), it may be advantageous to modify operating function $f_{preferred}$ to minimize the average daily energy consumption of motor 18, while still blocking the admission of direct solar radiation. This would reduce the required size and cost of the solar-charged power supply. This can be readily accomplished in system 10.

In general, the average daily energy consumption of motor 18 will be proportional to the average daily cumulative angular movement of louvers 32. One way to minimize the cumulative movement of louvers 32 is to constrain the range of allowable values of $\theta_{tilt}$. For example, referring to FIG. 5D, $\theta_{tilt}$ according to function $f_{tilt}$ ranges from approximately −55 degrees to approximately 0 degrees. This range could be reduced, while still ensuring blockage of direct solar component $I_{direct}$, by reducing the maximum value of $\theta_{tilt}$ from 0 degrees to −10 degrees. Then $f_{preferred}$ could be defined in the manner previously described, taking into account the revised shape of the $f_{tilt}$ curve.

This would reduce the average energy consumption (as well as wear) of motor 18, at the expense of some reduction in the average amount of diffuse illumination admitted by blind 17.

However, this will generally not be a desirable trade-off, since the savings due to the reduced size of the required solar-charged power supply (and reduced wear of motor 18) will be more than offset by the loss in energy savings due to reductions in the amount of admitted diffuse daylight. However, such a trade-off may be appropriate in certain applications in which there are severe constraints in the allowable acquisition cost of system 10.

Selective Admission of Direct Solar Radiation

Although the preferred embodiment operates to block the admission of the direct solar component $I_{direct}$, it may be advantageous in some applications to selectively admit $I_{direct}$.

ADMISSION OF $I_{DIRECT}$ FOR LOW VALUES OF $\Theta_I$

This might be the case, for example, if a masonry wall were located opposite window 21, and window 21 were located at a relatively great height with respect to desk 22 (previously shown in FIG. 3) In this case, $I_{direct}$ would strike desk 22 for relatively high values of solar incidence $\theta_i$, but would be completely received by the opposing wall for relatively low values of solar incidence $\theta_i$. Under these circumstances, it might be desirable for system 10 to admit $I_{direct}$ when two conditions are simultaneously met:

when the day of the year n is within a predetermined range corresponding to season in which artificial heating is required, and when the angle of incidence $\theta_i$ is great enough to ensure that the direct component $I_{direct}$ strikes the opposing wall without impinging desk 22.

This would enable the solar energy contained in $I_{direct}$ to be stored in the masonry wall, thereby reducing heating costs, without increasing cooling costs in summertime and without causing undue glare at desk 22. Such operation would require knowledge of the distance between window 21 and the opposing wall, of the height of window 21, and of the relative location of desk 22. This information could be used to calculate a threshold incidence angle above which $I_{direct}$ would be admitted, and below which $I_{direct}$ would be blocked. This threshold could then be used to construct an appropriate operating function (in accordance with the details previously given in connection with the preferred embodiment) to replace $f_{preferred}$ of the preferred embodiment.

ADMISSION OF $I_{DIRECT}$ FOR HIGH VALUES OF $\Theta_I$

Similarly, it might be desirable in some cases to admit $I_{direct}$ only for very high values of $\theta_i$. This might be the case, for example, when plants are located at the base of window 21, and desk 22 is located at a relatively great distance from window 21. Such operation would provide desirable direct sun for the plants, while preventing undue glare at desk 22. Such operation could be readily achieved in a manner similar to that described above.

ADMISSION OF $I_{DIRECT}$ AT PREDETERMINED TIMES

In some cases, it may be desirable to admit direct solar component $I_{direct}$ at certain times of the day, or on certain days of the week. For example, in wintertime, it might be desirable to admit $I_{direct}$ during weekends, and during certain weekday hours when no occupants are expected, to maximize solar heat gains. It is evident that an operating function to accomplish this can be readily developed using the information presented herein. Also, it can be seen that such a function could easily be implemented in system 10, inasmuch as time and date information is already available (via time t and day of the year n).

Compensation for Presence of Terrestrial Objects

As still another example, it is possible to implement a control function which compensates for the effects of terrestrial objects which shade window 21, as well as objects which cause specular reflections into window 21. Such alternative embodiments will be described subsequently.

Variations in Regulation Interval

Although the software operation of the preferred embodiment of system 10 regulates the louver tilt $\theta_{tilt}$ of venetian blind 17 (according to function $f_{preferred}$) with a period of five minutes, no attempt has yet been made to determine the optimum update rate or regulation interval.

Shorter Regulation Interval

In general, by minimizing the time-averaged difference between the actual and desired tilt angle $\theta_{tilt}$ of louvers 32, a shorter regulation interval would provide increased fidelity in the implementation of the control function $f_{preferred}$. In the limiting case, the louver tilt could be adjusted continuously. This could be accomplished by storing the derivative of the desired louver tilt (instead of the desired louver tilt itself), with respect to time, in NVM 16, and operating motor 18 to maintain the desired tilt speed.

However, there are two potential disadvantages with such operation:

If there is substantial mechanical friction in the operation of venetian blind 17, then continuous operation of motor 18 could result in jerky or discontinuous movements of louvers 32, which might be visually and audibly objectionable.

Such operation will generally require a relatively low tilt speed, but higher tilt speeds will also occasionally be required (e.g., for manual adjustment of the tilt to an arbitrary value). However, if the design of motor 18 and the associated speed-reduction mechanism (not shown) is optimized for a low tilt speed, then higher speeds may not be possible (or may result in very inefficient operation of motor 18). Possible solutions to this problem include oversizing of motor 18, use of a stepping motor or dual-winding motor for motor 18, or use of a variable speed-reduction mechanism between motor 18 and blind 17.

Longer Regulation Interval

On the other hand, regulation intervals longer than the preferred five minutes would decrease the fidelity in implementation of the control function $f_{preferred}$. However, a longer regulation interval offers two potential benefits: elimination of the need for interpolation, and reduced obtrusiveness of operation of system 10.

ELIMINATION OF NEED FOR INTERPOLATION

If an interval corresponding to the resolution of the time variable t of address word A of NVM 16 is used as the regulation interval for system 10, then there would be no need to interpolate the data of NVM 16 with respect to the variable t. For example, the variable t has a resolution of fifteen minutes in the preferred embodiment. If the regulation of tilt angle $\theta_{tilt}$ were performed at fifteen minute intervals instead of five minute intervals, then there would be no need to interpolate with respect to t.

REDUCED OBTRUSIVENESS OF OPERATION

In general, operation of system 10 will not go unnoticed by occupants of the host office; instead, visible movement of louvers 32, and noise caused by operation of motor 18, will be readily discernible and could be distracting or irritating. No attempt has yet been made to quantify these subjective effects.

However, it is probable that the potential for irritation could be minimized by minimizing the required number of adjustments of $\theta_{tilt}$ per day, even though this would entail a longer duration of operation of motor 18 per adjustment. It is evident that the number of required adjustments could be reduced by increasing the regulation interval, as described above.

IMPLEMENTATION OF LONGER REGULATION INTERVAL

If such a longer regulation interval were used, it would be advantageous to store the data of NVM 16 with a time offset equal to one-half of the resolution of variable t. Thus, the value of louver tilt $\theta_{tilt}$ stored in the memory location corresponding to t=m would actually be the value of $\theta_{tilt}$ for a time t=m+Res$_t$/2, where Res$_t$ is the resolution of the variable t. This would minimize the average error in the implementation of $f_{preferred}$.

Brightness-Regulating Operation

As previously described, the preferred embodiment of system 10 operates primarily to block the admission of the direct solar component $I_{direct}$ of the incident natural illumination, while admitting the indirect component $I_{indirect}$ and the diffuse component $I_{diffuse}$. It does not regulate the intensity, per se, of the admitted components. However, such regulation is possible, albeit with increased complexity in the software operation. The techniques for such regulation are described in the following paragraphs.

Regulation of admitted brightness with venetian blinds

As is known in the art, the intensity of the illumination admitted by a venetian blind is determined by the following factors:

the blind design characteristics (e.g., the louver reflectance and vertical spacing-to-width ratio);

the louver tilt angle;

the intensity and incidence angle of direct solar radiation, if present; and the intensity and angular distribution of incident diffuse illumination.

The latter two factors cannot easily be quantified; moreover, even when such information is available, accurate estimation of the intensity of the admitted illumination is mathematically intensive.

Accordingly, prior-art systems do not attempt to estimate the admitted brightness from other variables or parameters; instead, the illumination is measured directly, via in interior-mounted illuminance sensor. This provides a relatively accurate measure of the admitted brightness, but—as previously described—also involves a number of significant disadvantages.

However, a high degree of accuracy in brightness regulation is not needed for daylighting applications. Provided that extremes are avoided, a relatively wide variance in the admitted brightness will be tolerable (and, for psychological reasons, may actually be beneficial). Such a useful—but relatively coarse—brightness-regulation capability can be readily implemented in embodiments of system 10.

SIMPLIFIED BRIGHTNESS-REGULATING OPERATION

Empirical Brightness Model

Although the theoretical prediction of the illumination admitted by a venetian blind is relatively complex, a simple, sufficiently accurate model was empirically developed during testing of various embodiments of system 10. This model assumes that the direct solar component $I_{direct}$ is blocked, as previously described. Under this condition, the admitted illumination is essentially diffuse, and a good approximation to its brightness is given by:

$$B_{admit} = B_{ext} \cos(\theta_{tilt}),$$

where $B_{admit}$ is the perceived brightness of the admitted illumination.

Thus, the expression:

$$\theta_{tilt} = \cos^{-1}(B_{desired}/B_{ext})$$

defines the louver tilt angle $\theta_{tilt}$ required to achieve a value of admitted brightness $B_{admit}$ substantially equal to the desired brightness $B_{desired}$, given an exterior brightness $B_{ext}$.

Tilt Angle Operating Range for Brightness Regulation

As shown in FIG. 5D, blocking of the direct solar component $I_{direct}$ is accomplished in the preferred embodiment by maintaining a louver tilt $\theta_{tilt}$ which is less than the critical angle $\psi_{min}$. Thus, the range of louver tilt $\theta_{tilt}$ available for brightness regulation—while ensuring that the direct component remains blocked—is $\psi_{min} - \theta_{tiltmin}$. In general, this range will be relatively small at low values of the solar incidence angle $\theta_i$; however, there will be relatively little need for brightness regulation at such low incidence angles. On the other hand, the range of $\theta_{tilt}$ available for brightness regulation will be much greater at higher incidence angles, where regulation will be most needed.

FIG. 6A: Configuration of NVM 16

As previously described, NVM 16 of the preferred embodiment of system 10 stores data corresponding to the desired value of louver tilt $\theta_{tilt}$ (according to the function $f_{preferred}$).

However, for brightness-regulating operation, the value of louver tilt $\theta_{tilt}$ is not stored in NVM 16, but is instead determined from the sensed external brightness according to the equation:

$$\theta_{tilt} = \cos^{-1}(B_{desired}/B_{ext}).$$

Instead of storing values of $\theta_{tilt}$, NVM 16 stores values of the critical angle $\psi_{min}$ (i.e., the minimum louver tilt angle required to block direct solar radiation). As will be described subsequently, this $\psi_{min}$ data is then used to bound the desired value of louver tilt $\theta_{tilt}$ to ensure that the direct solar component—when present—is blocked.

Operating Function

As previously described, $\psi_{min}$ is a function of the solar incidence angle $\psi_i$, with the ratio of louver vertical spacing S to width W as a parameter. Also as previously described, the solar incidence angle $\theta_i$ is a function of the time t and the day n, with the prevailing location and orientation of the host window as parameters. Therefore, $\psi_{min}$ can be expressed as a function of the time t and the day n, with the prevailing location and orientation of the host window, and ratio of louver vertical spacing S to width W, as parameters. By holding these parameters constant, a new operating function $f_{brightness}$ can be defined, such that:

$$\psi_{min} = f_{brightness}(n, t)$$

This operating function defines the data which is stored in NVM 16 for simplified brightness regulating operation.

Referring now to FIG. 6A, NVM 16 accepts an address word A, and either reads or writes a data word D. Address word A represents the variables t and n, while data word D represents the corresponding critical angle $\psi_{min}$ according to operating function $f_{brightness}$, for the values of t and n denoted by A. The values of the variables t and n are derived from real-time clock/calendar 15, while the critical angle $\psi_{min}$ is registered by microcontroller 14. The required resolution and dynamic range of the variables t and n are the same as those of the preferred embodiment shown in FIG. 5F; accordingly, the required size of NVM 16 is the same as that of the preferred embodiment (i.e., 1024 bytes).

FIG. 6B: Flowchart of Software Operation

The software operations performed in the simplified brightness-regulating embodiment differ slightly from those previously shown in FIG. 4 for the preferred, glare-blocking embodiment. The required software operations for the brightness-regulating embodiment are shown in FIG. 6B.

Steps 27 and 33: Brightness Measurement and Test for Presence of Daylight

The software operation begins with software step 27 (shown previously in FIG. 4), in which the external brightness $B_{ext}$ is measured via brightness sensor 12. Then, in a software step 33, the measured value of $B_{ext}$ is compared to a first threshold to determine whether or not daylight is incident on the window.

Step 29: Operation in Response to Absence of Daylight

If, in step 33, the measured value of $B_{ext}$ is found to be less than the rest predetermined threshold, then software step 29 (previously shown in FIG. 4) is executed, in which louvers 32 are tilted to a predetermined, fixed position appropriate for nighttime (e.g., fully closed, to maximize privacy).

Steps 34 through 38: Operation in Response to Presence of Daylight

If, however, the measured value of $B_{ext}$ is found in step 33 to exceed the first predetermined threshold, then daylight is assumed to be incident on the window, and a step 34 is executed.

Step 34: Calculation of Required Tilt Angle for Brightness Regulation

In step 34 a value of louver tilt $\theta_{tilt}$ which will provide the desired admitted brightness $B_{desired}$ as a function of the external brightness $B_{ext}$ is calculated. This desired value of $\theta_{tilt}$ is labeled $\Theta_{des}$ and is calculated (as previously described) by taking the inverse cosine of the ratio of the desired brightness $B_{desired}$ to the external brightness $B_{ext}$.

Step 35: Test for Incidence of Direct Solar Radiation

In step 35, the measured value of $B_{ext}$ is compared to a second predetermined threshold in order to determine whether or not direct solar radiation is incident on the window. If the measured value of $B_{ext}$ is less than the second predetermined threshold, then only diffuse daylight is assumed to be present, and a step 36 is executed. If, however, the measured value of $B_{ext}$ exceeds the second predetermined threshold, then direct solar radiation is assumed to be incident, and a step 37 is executed.

Step 36: Operation in Response to Diffuse Daylight

In step 36, the tilt angle of louvers 32 is automatically adjusted to $\Theta_{des}$ (previously calculated in step 34) in order to regulate the admitted brightness. After completion of step 36, software operation is transferred back to step 27.

Steps 37 and 38: Operation in Response to Direct Solar Radiation

If in step 35, the measured value of $B_{ext}$ is found to exceed the second predetermined threshold, then direct solar radiation is assumed to be incident on the window, and a step 37 is executed. In step 37, the minimum critical louver tilt angle $\psi_{min}$ for the prevailing time t and day n is read from NVM 16 (with appropriate interpolation, if required, as previously described for the preferred embodiment). Then, in a software step 38, the louver tilt angle $\theta_{tilt}$ is adjusted to the lesser of $\psi_{min}$ and $\Theta_{des}$. Maintaining a louver tilt angle less than $\psi_{min}$ ensures that direct solar radiation will be blocked, while maintaining a louver tilt angle less than $\Theta_{des}$ ensures that excessive diffuse daylight will not be admitted. After completion of step 38, software operation is transferred back to step 27.

BRIGHTNESS-REGULATING OPERATION WITH INCREASED ACCURACY

As previously stated, a simplified brightness-regulating capability can easily be implemented in alternative embodiments of system 10 by assuming that the admitted brightness is proportional to the cosine of the tilt angle $\theta_{tilt}$. While this will provide acceptable accuracy for many applications, greater accuracy could be achieved via the approach described in the following paragraphs.

GENERAL CONCEPT

Greater accuracy in brightness regulation could be achieved via a more complex predictive model for the brightness of the illumination admitted by blind 17. This model could then be used to define previously mentioned control function $f_{ratio}$, such that $$\theta_{tilt} = f_{ratio}(t, n, R_b),$$

where $R_b$ is the ratio of desired brightness $B_{desired}$ admitted by the blind to the exterior brightness $B_{ext}$.

The function $f_{ratio}$ would also include, as parameters, the local latitude $\lambda$ and longitude $L_{local}$, the azimuth orientation of the window $\phi_{window}$, and the ratio of louver vertical spacing S to width W of venetian blind 17.

Thus, $f_{ratio}$ would define the louver tilt angle $\theta_{tilt}$ required to admit desired brightness $B_{desired}$, for an external brightness $B_{ext}$ and for the solar geometry corresponding to the time t and the day n. Function $f_{ratio}$ could be made to respond appropriately to the absence of daylight, as well as to the presence of direct solar radiation. For example:

When the value of $R_b$ is extremely high (indicating the absence of daylight), the function $f_{ratio}$ could call for an extreme value of louver tilt $\theta_{tilt}$, for maximum privacy.

When the value of $R_b$ is extremely low (indicating the presence of direct solar radiation), the function $f_{ratio}$ could call for a value of $\theta_{tilt}$ which both blocks direct solar radiation (i.e., with a value of $\theta_{tilt}$ less than $\psi_{min}$), and ensures that the excessive diffuse daylight will not be admitted.

When the value of $R_b$ is neither very low nor very high (indicating the presence of diffuse daylight), the function $f_{ratio}$ could call for a value of $\theta_{tilt}$ as a function of $R_b$, according to a predetermined brightness model, that causes the desired amount of diffuse daylight to be admitted.

The function $f_{ratio}$ would ideally be developed empirically. However, practitioners in the art will recognize that sufficient theoretical basis exists in the literature to support analytical development of such a model, if desired. Analytical development of such a model would require knowledge of the illumination transfer function of the host venetian blind, as well as of the angular distribution of the illumination incident on the host window.

Many workers have examined the transfer function of venetian blinds (see, for example, Parmalee, G. V. and Aubele, W. W., *The Shading of Sunlit Glass: An Analysis of the Effect of Uniformly Spaced Flat Opaque Slats*, ASHVE Research Report No. 1460, ASHVE Transactions, Vol. 58, 1952, p. 377).

Much work has also been done (e.g., under the aegis of the Illuminating Engineering Society of North America) to develop models for the angular distribution of diffuse illumination for various meteorological conditions.

Once defined, the function $f_{ratio}$ could be implemented via table look-up operations on data stored in NVM 16.

FIG. 6C: Configuration of NVM 16

Referring now to FIG. 6C, a configuration of NVM 16 to implement the previously described function $f_{ratio}$ is now described.

The function $f_{ratio}$ includes three variables: the time t, the day n, and the brightness ratio $R_b$. In order to implement the function $f_{ratio}$, therefore, address word A of NVM 16 must represent the values of these three variables. In contrast, the address word A of the configurations previously shown in FIGS. 5F and 6A represented only the variables t and n. Thus, for an equivalent resolution and dynamic range of the variables t and n, the configuration of FIG. 6C would require a larger storage capacity of NVM 16 than would the configurations of FIGS. 5F or 6A, due to the need to additionally represent the value of variable $R_b$.

The required dynamic range and resolution of variable $R_b$ has not yet been established, but based on experience to date, a quantization to 16 discrete values should be sufficient. Thus, in address word A, four bits could be allocated to variable $R_b$, four bits to variable n, and six bits to variable t. This would result in total length of address word A of 14 bits, for a required storage capacity of 16 kilobytes. This is within the capacity of available serial EEPROMs (e.g., the model 24C16 serial EEPROM, manufactured by Microchip Technology, Inc.).

FIG. 6D: Software Operation

FIG. 6D shows a flowchart of the high-level software operations performed in the alternative brightness-regulating embodiment.

Since the function $f_{ratio}$, as described above, already encompasses the full expected range of external brightness from night-time to direct solar incidence, the software operation is considerably simplified relative to the embodiments described previously (and shown in FIGS. 4 and 6B). Specifically, while the software operations of FIGS. 4 and 6B each include three distinct branches (each corresponding to a range of external brightness), the software operation of the alternative embodiment of FIG. 6D requires only a single branch.

Software Steps 27 and 39: Measurement of External Brightness and Calculation of Brightness Ratio $R_b$ The software operation begins with software step 27 (shown previously in FIG. 4), in which the external brightness $B_{ext}$ is measured via brightness sensor 12. Then, in a software step 39, the ratio $R_b$ is computed by dividing the desired brightness $B_{desired}$ of the admitted illumination to the measured value of the external brightness $B_{ext}$. The value of $B_{desired}$ could be a fixed value previously stored in NVM 16, or (preferably) could be set via a conventional manual control (not shown) interfaced to microcontroller 14.

Software Steps 40 and 41: Reading and Interpolation of Desired Louver Tilt $\theta_{tilt}$ After the brightness ratio $R_b$ is determined, a step 40 is performed, in which several values of $\theta_{tilt}$, according to function $f_{ratio}$, are read by microcontroller 14 from NVM 16. These are the values of $\theta_{tilt}$ corresponding to the quantized values of the variables time t, day n, and brightness ratio $R_b$, which bound the actual values of these variables. In general, eight combinations of quantized values of variables t, n, and $R_b$ will be required to bound a particular combination of actual values of these variables; hence, eight values of $\theta_{tilt}$ will be typically be read from NVM 16 for each combination of actual time t, day n, and brightness ratio $R_b$.

Then, in a step 41, the value of $\theta_{tilt}$ corresponding to the combination of actual values of actual time t, day n, and brightness ratio $R_b$ is interpolated from the eight bounding values of $\theta_{tilt}$.

The operations performed in steps 40 and 41 are similar to those of the previously described step 41 (see FIG. 5D), with the exception that an eight-point, versus four-point, interpolation is performed in steps 40 and 41. Both the four-point interpolation of FIG. 5G and the eight-point interpolation of FIG. 6D are conventional interpolations, and many approaches are known in the art for efficiently implementing them.

Step 31C: Tilting of Louvers

Then, step 31B (previously shown in FIG. 4) is performed, in which microcontroller 14 actuates motor 18, via switch array 19, to tilt louvers 32 to the desired value of louver tilt θti., as sensed by position feedback sensor 20.

Compensation for Presence of Terrestrial Objects

Terrestrial objects such as trees or buildings can either reduce (via shading) or increase (via reflection) the illumination incident on a window. Moreover, if the reflection is specular (e.g., from glass or metal objects), the reflected illumination can give rise to glare which would not be expected from analysis of the solar geometry per se.

The aforementioned embodiments of system 10 are capable of compensating for the presence of shading objects (via sensing of the incident brightness with brightness sensor 12), but cannot compensate for the presence of reflections. Reflected illumination can be substantial (e.g., in the case of illumination reflected from snow-covered ground), but is typically diffuse. Diffuse reflected illumination will generally not present a problem. On the other hand, specular reflections—while occurring relatively infrequently—could present a significant problem in certain applications.

However, it is possible to modify the operation of system 10 to compensate for these effects. Several degrees of compensation are possible; two of these are described in the following paragraphs Simplified Operation to Block Glare from Specular Reflections The operation of system 10 can be readily modified to block glare due to specular reflections from terrestrial objects. Such a modification involves two additional operating steps: detecting the presence of specular reflections, and adjusting the louver tilt to a high value to block the admitted illumination.

Detecting the Presence of Specular Reflections

The presence of specular reflections can be detected by sensing relatively high levels of external brightness at times when no direct solar radiation is expected. This can be facilitated by storing, in NVM 16, the times at which direct solar radiation is expected, along with the desired value of louver tilt $\theta_{tilt}$ (as previously described).

The expected times at which direct solar radiation is expected can be determined using the information provided by the previously mentioned function $f_{solar}$. Function $f_{solar}$ defines the solar incidence angle $\theta_i$ as a function of time t, day n, latitude $\lambda$, longitude $L_{local}$, and window orientation $\theta_{window}$. A sample plot of $f_{solar}$ showing the expected solar incidence angle $\theta_i$ as a function of time t and day n, for a window having a southwestern orientation in Washington, D.C., was previously shown in FIG. 4E.

By definition, direct solar radiation is incident only for values of $\theta_i$ less than ninety degrees. Thus, the expected incidence of direct solar radiation can be easily ascertained by comparing the value of $\theta_i$ to ninety degrees. The results of such a comparison can be used to generate a one-bit variable, J, such that J is true if $\theta_i$ is less than ninety degrees, and false if $\theta_i$ is greater than ninety degrees. Thus, J defines the expected incidence of direct solar radiation as a function of time t and day n, for the prevailing latitude $\lambda$, longitude $L_{local}$, and window azimuth orientation $\phi_{window}$.

The variable J could be stored in NVM 16, along with the desired louver tilt value $\theta_{tilt}$ according to operating function $f_{preferred}$ (or other appropriate operating function). If the data words of NVM 16 are one byte (i.e., eight bits) wide (as in the preferred embodiment), seven bits could be allocated to $\theta_{tilt}$ and one bit to J.

With the expected incidence of direct solar radiation thus stored in NVM 16, the presence of specular reflections could be determined by comparing the output of brightness sensor 12 to a predetermined threshold. If brightness exceeds the threshold, and if variable J is false, then a specular reflection could be considered to be present.

ADJUSTMENT OF LOUVER TILT TO BLOCK SPECULAR REFLECTIONS

System 10 could be programmed to respond to the presence of specular reflections by adjusting the louver tilt $\theta_{tilt}$ to its maximum value, thus blocking the reflected glare. This would also block the desirable diffuse illumination, but this would be tolerable in most applications, due to the expected infrequent occurrence of significant specular reflections.

Increased Accuracy in Compensation for Presence of Fixed Terrestrial Objects

Greater accuracy in compensating for the presence of fixed terrestrial objects could be achieved by analytically predicting both the shading, and reflecting effects of such objects, and including compensation for these effects in the control functions (e.g., $f_{operate}$, $f_{preferred}$, $f_{ratio}$ or other appropriate control function). Analytic prediction of such effects is possible using conventional techniques.

For example, analysis of shading effects is important in architectural design (e.g., for designing window overhangs to control solar heat gains); accordingly, techniques for the prediction of shading effects are well-known. A discussion of one such technique is given by Kreider and Rabl(Kreider, Jan F. and Ari Rabl (1994), Heating and Cooling Of Buildings, McGraw-Hill, New York, section 6.1.3).

Similarly, techniques for the prediction of reflective effects have been developed for optical and microwave applications, and such techniques are also used in the image rendering algorithms used in many software packages for computer-based, three-dimensional modeling. An important class of such techniques is ray-tracing analysis.

In order to use conventional techniques for shading and ray-tracing analysis, the following information would be required for each significant object in proximity to the host window:

the object's location;

its size, shape, and orientation;

its transmissivity; and its reflectivity.

Given this dam, the effects of proximal objects—as a function of time and day—could be analytically predicted, in a conventional manner, for the latitude and longitude of the host window. Then, the required louver tilt angle $\theta_{tilt}$ for optimum daylighting performance in the presence of such effects—also as a function of time and day—could be determined and stored in NVM 16. System 10 would then operate, as previously described, to continuously maintain the appropriate value of louver tilt $\theta_{tilt}$.

Alternative Method of Detecting Presence of Direct Solar Radiation

As previously shown in FIG. 4, the incidence of direct solar radiation is detected in the preferred embodiment by comparing the external brightness, measured with brightness sensor 12, to a predetermined threshold. In most cases, this method will reliably detect the presence of direct solar radiation without excessive false detections.

However, an even more reliable method of detection can be implemented, with some increase in software complexity, by using not only the external brightness information from brightness sensor 12, but also the values of binary variable J (as previously described in connection with detection of the presence of specular reflections) stored in NVM 16. In this method, the presence of direct solar radiation is detected when:

variable J is true, and the external brightness is greater than a predetermined threshold.

Otherwise, direct solar radiation is assumed to be absent.

Use of both variable J and the external brightness information increase the accuracy of detection of direct solar radiation, with only a minor increase in software complexity.

Empirical Determination of Desired Louver Tilt Angle

As previously stated, function $f_{preferred}$ of the preferred embodiment expresses the desired louver tilt angle $\theta_{tilt}$ as a function of the time t and day n, with the geographic location (local latitude $\lambda$, and longitude $L_{local}$), window azimuth orientation $\phi_{window}$, and louver vertical spacing-to-width ratio S/W as parameters. In the preferred embodiment, function $f_{preferred}$ is analytically evaluated to establish the desired values of louver tilt $\theta_{tilt}$ which are stored in NVM 16.

However, it is not necessary to analytically evaluate $f_{preferred}$ to establish the desired values of $\theta_{tilt}$; they could instead be established empirically—as a function of time t and day n—for a given geographic location, window orientation, and louver vertical spacing-to-width ratio S/W. This could be done, for example, by installing an appropriate measurement apparatus at the intended installation of system 10, periodically measuring a desired louver tilt angle, and then recording this angle as a function of the time of the day and day of the year. This data could then be stored in NVM 16 of system 10.

This approach has the advantage of eliminating potential errors in the analytic evaluation of function $f_{preferred}$, and of taking into account some of the shading and reflection effects of proximal terrestrial objects. However, this procedure would be time-intensive: data may have to be collected over an entire year, and the process would have to be repeated at each geographic location and orientation at which system 10 is to be installed. For these reasons, empirical determination of $\theta_{tilt}$ will generally be less desirable than the preferred method described previously.

Empirical Determination of Solar Incidence Angle

As previously stated, the function $f_{preferred}$ of the preferred embodiment, which represents the desired louver tilt angle $\theta_{tilt}$, implicitly includes function $f_{solar}$, which defines the solar incidence angle $\theta_i$ as a function of time of the day t, day of the year n, geographic location (via local latitude $\lambda$, and longitude $L_{local}$) and window azimuth orientation $\phi_{window}$. In the preferred embodiment, function $f_{preferred}$ is analytically evaluated to establish the desired values of louver tilt $\theta_{tilt}$ which are stored in NVM 16. This process implicitly includes analytic determination of function $f_{solar}$.

However, it is not necessary to analytically evaluate $f_{preferred}$ or $f_{solar}$ to establish the solar incidence angle $\theta_{tilt}$; it could instead be established empirically—as a function of time t and day n—for any given geographic location and window orientation. This could be done, for example, by installing an appropriate apparatus at the intended installation of system 10, periodically measuring the solar angle of incidence $\theta_i$, and then recording this angle as a function of the time of the day and day of the year. This data could then be used to establish the desired values of louver tilt $\theta_{tilt}$ to be stored in NVM 16 (or could be stored directly in NVM 16 for those embodiments of system 10 which require explicit storage of the incidence angle $\theta_i$). Many instruments are available for directly measuring and recording the solar angle of incidence. However, this process will be time-intensive, and will generally be less desirable than the analytic method of the preferred embodiment.

Alternatively, data concerning the solar angle of incidence, as a function of time, day of the year, and azimuth orientation, is already available in tabular form for many geographic locations. When available, this data could be used directly, without significant further analytic or empirical effort, to establish the solar incidence angle $\theta_i$ or the desired louver tilt angle $\theta_{tilt}$, as a function of time and day, for system 10.

Use of Alternative Window Coverings

Although the preferred embodiment includes conventional venetian blind 17, other types of window coverings could also be used in electronically controlled window covering 13 of system 10 (see FIG. 2).

Louvered Window Coverings

Other types of louvered window coverings, such as vertical venetian blinds, could also be used instead of the horizontal venetian blind of electronically controlled window covering 13. Practitioners in the art will recognize that—like horizontal blinds—vertical blinds are capable of blocking direct solar radiation if the louver orientation is adjusted appropriately. The analysis of the shading effects of vertical blinds is much the same as for horizontal blinds, except that the axis of louver rotation is displaced by ninety degrees, and the angle of azimuth incidence $\phi_i$ (and not the angle of elevation incidence $\theta_i$), is the salient solar geometric variable.

Otherwise, vertical venetian blinds can be used in system 10 in much the same way as horizontal venetian blinds, and an appropriate control function—analogous to function $f_{preferred}$ of the preferred embodiment—can be constructed to define a desired louver orientation as a function of the time t and day n, with the geographic location (local latitude $\lambda$ and longitude $L_{local}$), window azimuth orientation $\phi_{window}$, and louver spacing-to-width ratio S/W as parameters.

Variable-Transmissivity Window Coverings

Variable-transmissivity window coverings, such as electrochromic glazings, could also be used with system 10. Such a window covering would replace electronically controlled window covering 13 of FIG. 1. This type of window covering is not capable of selectively blocking rays incident from a particular direction. However, system 10 could adjust the transmissivity of such a window covering to a relatively low value when direct solar radiation is incident, thus effectively preventing glare. The incidence of direct solar radiation could be ascertained by detecting a relatively high level of external brightness at times when direct solar radiation is expected. As previously described, the expected times of incidence of direct solar radiation—as a function of the time t, day n, with the local latitude $\lambda$, longitude $L_{local}$, and window azimuth orientation $\phi_{window}$ as parameters—could be stored as binary variable J in NVM 16.

A variable-transmissivity window covering could also be used for brightness regulation. This could be accomplished by defining an appropriate control function similar to $f_{ratio}$ (as previously described for the preferred embodiment), and storing the desired control values according to this function in NVM 16 as a function of time t, day n, and ratio $R_b$ of desired admitted brightness to external brightness.

Variable-Aperture-area window coverings

Referring to FIG. 2, a variable-aperture window covering (such as a roller shade or curtain) could be used instead of venetian blind 17 in electronically controlled window covering 13. Variable-aperture window coverings typically include a pleated or rolled sheet of shading material, which can be extended or unrolled to expose a variable aperture area a of the host window. Thus, variable-aperture window coverings are capable of varying the total luminous flux admitted by the Window. However, unlike louvered window coverings, variable-aperture-area windows coverings are incapable of selectively blocking radiation from a given direction while simultaneously admitting radiation from other directions.

Still, variable-aperture window coverings can be useful in embodiments of the subject invention, as described in the following paragraphs.

GLARE-BLOCKING OPERATION

In one simple embodiment, system 10 could automatically adjust window covering 13 to one of two positions, depending on the presence of direct solar radiation:

the fully opened position, when direct solar radiation is incident on the window; or the fully closed position, when no direct solar radiation is incident on the window.

In the fully opened position, window covering 13 would admit natural illumination and provide an unobstructed view through the window. In the fully closed position, window covering 13 would block the admission of direct solar radiation (and the attendant glare). Moreover, if the shading material of window covering 13 were translucent, substantial diffuse illumination would also be admitted in the closed position, when direct solar radiation is incident.

The presence of direct solar radiation could be determined, as previously described, via use of predetermined values of the binary variable J stored in NVM. 16, and the output of brightness sensor 12.

BRIGHTNESS-REGULATING OPERATION

Since variable-aperture window coverings are capable of varying the total admitted luminous flux, they can be used, in principle, for brightness regulation. However, brightness-regulating operation with such window coverings will be most effective when the host window is not within the field-of-view of the office occupants (e.g., with clerestory windows), or when the window is relatively far from the office occupants. Otherwise, if the window is within the field-of-view and is relatively close to the office occupants, the apparent brightness may not vary appreciably with different positions of the window covering.

General Concept

Two methods of brightness-regulating operation were previously described in connection with venetian blind 17 of the preferred embodiment:

a simplified method, based on use of an empirical brightness model in which the estimated admitted brightness $B_{admit}$ is a function of just the external brightness $B_{ext}$ (as sensed by brightness sensor 12) and the louver tilt angle $\theta_{tilt}$; and a more accurate method, based on use of a complex brightness model in which $B_{admit}$ is a function of the time t, the day n, and the external brightness $B_{ext}$, and in which the desired louver position $\theta_{tilt}$—according to function $f_{ratio}$—is stored NVM 16.

Either of these basic approaches could also be used with a variable-aperture window covering (substituting, of course, variable window aperture area α for the louver tilt $\theta_{tilt}$).

Simplified Brightness-Regulating Operation

Simplified brightness-regulating operation with a variable-aperture window covering can be achieved by defining a brightness model, which estimates the admitted brightness $B_{admit}$ as function of the external brightness $B_{ext}$ and the aperture area α of window covering 13. One such model is:

$$B_{admit} = k*B_{ext}*\alpha,$$

where $B_{admit}$ and $B_{ext}$ are as previously defined, k is a constant, and

α is the aperture area of window covering 13.

Such a model can be used to calculate the required aperture area α(and hence the required setting of the window covering) to produce a desired brightness $B_{desired}$. Such a calculation is trivial, and could readily be implemented in real-time within microcontroller 14. However, such operation would suffer from the same limitation as prior-art brightness-regulating systems: inability to block direct solar radiation. This advantage can be overcome, as described subsequently, by combining brightness-regulating and glare-blocking modes of operation.

Brightness-Regulating Operation With Increased Accuracy

More accurate brightness-regulating operation could be achieved by defining a model which relates the admitted brightness $B_{admit}$ to the external brightness $B_{ext}$, the prevailing solar geometry, and the azimuth orientation of the host window. Such a model would ideally be established empirically, but could also be established analytically.

This model could then be used to define an operating function, similar to the previously described function $f_{ratio}$, which expresses the desired aperture area α of window covering 13 as a function of the prevailing time t, day n, and desired brightness ratio $R_b$, with latitude λ, longitude $L_{local}$, and window azimuth orientation $\phi_{window}$ as parameters. The desired values of A could then be stored in NVM 16, with address word A of NVM 16 including quantized values oft, n, and $R_b$. As previously described, a relatively coarse quantization for these variables, coupled with linear interpolation, could be used to provide adequate effective resolution within a relatively small capacity of NVM 16.

Brightness-Regulating Operation in Conjunction With Glare-Blocking Operation

The brightness-regulating and glare-blocking operations described above are complementary; both capabilities could be implemented in system 10. For example, system 10 could be programmed to:

adjust window covering 13 to the fully closed position when direct solar radiation is present; and adjust the aperture area of window covering 13 to implement either of the aforementioned brightness-regulating operations when direct solar radiation is absent.

This characteristic could be implemented in software outside the operating function, or could instead be embodied in the operating function.

Use With Non-Vertical Windows

The preceding embodiments were described in connection with their use with windows having a vertical orientation. However, as will be apparent to those skilled in the art, the subject invention can also be used with windows (for example, skylights) having a non-vertical orientation. This could be achieved by modifying function $f_{solar}$ to include the window elevation orientation $\theta_{window}$ as a parameter (in addition to the local latitude λ, longitude $L_{local}$, and window azimuth orientation $\phi_{window}$).

The required analytical considerations are shown, for example, by Kreider and Rabl (Kreider, Jan F. and Ari Rabl, 1994, *Heating and Cooling Of Buildings*, McGraw-Hill, New York, pp. 228 and 232), who discuss the determination of the solar angle of incidence $\theta_i$ as a function of the time t and day n—with the local latitude λ, longitude $L_{local}$, window azimuth orientation $\phi_{window}$, and window elevation orientation $\theta_{window}$ as parameters.

Use Without Adaptive Lighting System

While the greatest benefits of system 10 would be achieved when used in conjunction with adaptive lighting system 23, lighting system 13 is not required for useful operation of system 10.

Even without such a lighting system, system 10 would provide substantial benefits in morale and working efficiency, due to the advantageous spectral composition of daylight (and the psychological advantages of providing a view).

Moreover, some energy savings could still be realized, by:

reducing the installed lighting power in the ceiling fixtures nearest the window (e.g., by removing some of the bulbs, or reducing their wattage); and using high-efficiency desk or floor lamps, located near the desks of the office occupants, which could be conveniently switched on when insufficient daylight is available to meet the illumination requirements.

CONCLUSIONS, RAMIFICATIONS, AND SCOPE

It is evident from the preceding discussion that automatic window covering system 10 according to the subject invention is capable of automatically regulating the illumination passing through a host window to admit useful, diffuse daylight while simultaneously blocking direct solar radiation (and the attendant glare).

It is also evident that system 10 is capable of performing these functions autonomously, without need for interfacing to external equipment and without need for a solar Angle Of Incidence (AOI) sensor, as required in prior-art systems. It was shown that system 10 accomplishes this by actuating window covering 13 to a setting $Setting_{wc}$ which is determined by certain primary parameters or variables:

- the external brightness $B_{ext}$ as sensed by conventional brightness sensor 12;
- the desired characteristics $I_{desired}$ (e.g., the desired brightness $B_{desired}$) of the admitted illumination;
- the time t and day of the year n, as registered in real-time clock/calendar 15;
- the geographic location $LOC_{win}$ (specifically the latitude $\lambda$, and longitude $L_{local}$), and orientation $ORIENT_{win}$ (specifically the azimuth orientation $\phi_i$ and optionally the elevation orientation $\theta_i$) of window 21; and
- the salient design characteristics $DESIGN_{wc}$ of electronically controlled window covering 13 (e.g., the ratio of louver vertical spacing S to louver width W for venetian blind 17).

It was also shown that, while the calculations necessary to control window covering system 13 could be performed in real-time, a subset of the calculations are advantageously performed beforehand, with the results stored in NVM 16, to enable a simplified hardware and software embodiment of system 10. It was shown that such an embodiment can be facilitated by developing an appropriate control function (e.g., $f_{preferred}$) which expresses $Setting_{wc}$ as a function only of the variable quantities (e.g., time t, day n, and brightness $B_{ext}$) which change over the course of operation of system 10.

It is apparent, therefore, that the subject invention provides an extremely practical means of using daylight to reduce the need for (and costs of) artificial illumination in buildings. From the preceding discussion, it will be evident to practitioners in the art that the subject invention is complementary to (and can be advantageously coupled with) other types of automatic window covering systems, such as the retrofittable automatic venetian blind controller or the dual-mode automatic window covering of my aforementioned co-pending applications.

A preferred embodiment of the subject invention was shown in which system 10 includes venetian blind 17. However, it was also shown that the subject invention can also include other types of window coverings, such as curtains, shades, or electrochromic glazings.

Although the preferred embodiment is not capable of regulating the brightness of thee admitted illumination, it was shown that alternative embodiments are capable of regulating the brightness of the admitted illumination, as well as compensating for the presence of shading and specular reflections due to terrestrial objects. In fact, it is evident that the subject invention can be made to regulate any illumination characteristic (e.g., brightness, polarization, spectral balance, etc.) which can be modulated by the window covering, and which can be expressed as a function of the setting of the window covering, the external brightness $B_{ext}$ as sensed by conventional brightness sensor 12, the time t, the day of the year n, and the geographic location $LOC_{win}$ and orientation $ORIENT_{win}$ of window 21.

It was shown that automatic window covering system 10 is most advantageously used with an independent, adaptive electric lighting system capable of automatically adjusting lamp brightness to maintain a constant level of interior illumination. However, it is also evident that system 10 would provide significant energy-savings and convenience benefits even if such a lighting system were not present.

Those skilled in the art will recognize that the construction and function of the elements composing the preferred and alternative embodiments described herein may be modified, eliminated, or augmented to realize many other useful embodiments, without departing from the scope and spirit of the invention as recited in the appended claims.

I claim:

1. A method of control of a window covering to regulate illumination admitted through a window, said window covering having an adjustable setting, said window having a certain geographic location, a certain orientation, and an outside surface receiving an incident illumination, said incident illumination produced by a sun, said sun having a relative angular position with respect to said window, said relative angular position varying with time of day and day of year, said relative angular position further dependent on said certain geographic location and said certain orientation of said window, said relative angular position uniquely defined by a pair of angular variables, said method including the steps of:

a) providing storage means for storing and recalling digital information;

b) providing time-registering means for registering a current time of day and a current day of year;

c) predicting a first expected value of at least one angular variable of said pair of angular variables, said first expected value associated with a first arbitrary time of day on a first arbitrary day of year, said predicting step performed prior to said first arbitrary time of day on said first arbitrary day of year;

d) defining a first digital value as a first predetermined function of a first plurality of quantities, said first plurality of quantities including said first expected value of said one angular variable, said defining step performed prior to said first arbitrary time of day on said first arbitrary day of year;

e) storing said first digital value in said storage means, said storing step performed prior to said first arbitrary time of day on said first arbitrary day of year;

f) recalling said first digital value from said storage means;

g) establishing a desired setting of said window covering as a second predetermined function of a second plurality of quantities, said second plurality of quantities including:
   i) said first digital value,
   ii) said current time of day and said current day of year, and iii) said first arbitrary time of day and said first arbitrary day of year; and h) adjusting said window covering to said desired setting.

2. The method of claim 1, wherein said establishing step includes the step of equating said desired value to said first digital value, said equating step performed under a predetermined set of conditions, said set of conditions including:

a) a first condition under which a first absolute value of a first difference between said current brightness value and said first arbitrary value of said brightness is less than a first predetermined threshold;

b) a second condition under which a second absolute value of a second difference between said current time of day and said first arbitrary time of day is less than a second predetermined threshold; and c) a third condition under which a third absolute value of a third difference between said current day of year and said first arbitrary day of year is less than a third predetermined threshold.

3. The method of claim 1, wherein said method further includes the steps of:

a) predicting a second expected value of said second angular variable, said second expected value associated with a second arbitrary time of day on said first arbitrary day of year;

b) obtaining a second digital value by evaluating said first predetermined function for said second expected value of said one angular variable; and c) storing and recalling said second digital value from said storage means;

and wherein said establishing step includes the step of interpolating between said first digital value and said second digital value to obtain said desired setting, said desired setting corresponding to said current time of day on said current day of year.

4. A method of operating a venetian blind to regulate illumination admitted through a window, wherein:

a) said venetian blind has a plurality of louvers, each of said plurality of louvers rotatable in a plane perpendicular to said window, said plurality of louvers having a common tilt angle, said tilt angle corresponding to rotational displacement of said louvers in said plane with respect to a reference orientation, said tilt angle variable over an operating range, said operating range bounded by a minimum limit value and a maximum limit value;

b) said window has a geographic location, an orientation, and an outside surface receiving an incident illumination, said incident illumination including a direct component;

c) said direct component is produced by a sun, said sun having a relative angular position with respect to said window, said relative angular position uniquely defined by a first angular variable and a second angular variable, said first angular variable defining said angular position of said sun in said plane, said first angular variable and said second angular variable varying with time of day and day of year, said first angular variable and said second angular variable further varying with said geographic location and orientation of said window; and d) said direct component passes through said venetian blind for a critical range of values of said tilt angle, said direct component being blocked for values of said tilt angle outside said critical range, said critical range contained within said operating range, said critical range bounded by a minimum critical angle and a maximum critical angle, said minimum critical angle and said maximum critical angle varying with said first angular variable;

said method including the steps of:

e) providing storage means for storing and recalling information;

f) providing time-registering means for registering a current time of day and a current day of year;

g) selecting a first reference value of said tilt angle from a first blocking range of values of said tilt angle, said first blocking range bounded by said minimum limit value and a first critical value of said minimum critical angle, said first critical value associated with a first expected value of said first angular variable, said first expected value of said first angular variable corresponding to said relative angular position of said sun at a first arbitrary time of day on a first arbitrary day of year, said selecting step performed prior to said first arbitrary time of day on said first arbitrary day of year;

h) storing said first reference value in said storage means, said storing step performed prior to said first arbitrary time of day on said first arbitrary day of year;

i) recalling said first reference value from said storage means;

j) defining a desired value of said tilt angle as a first predetermined function of a first plurality of quantities, said first plurality of quantities including:
  i) said first reference value of said tilt angle,
  ii) said first arbitrary time of day and said first arbitrary day of year, and
  iii) said current time of day and said current day of year; and k) adjusting said tilt angle of said plurality of louvers to said desired value.

5. The method of claim 4, wherein said defining step includes the step of equating said desired value of said tilt angle to said first reference value, said equating step performed under a predetermined set of conditions, said predetermined set of conditions including:

a) a first condition under which a first absolute value of a first difference between said current time of day and said first arbitrary time of day is less than a first predetermined threshold; and b) a second condition under which a second absolute value of a second difference between said current day of year and said first arbitrary day of year is less than a second predetermined threshold.

6. The method of claim 4, wherein said method further includes the steps of:

a) selecting a second reference value of said tilt angle from a second blocking range of values of said tilt angle, said second blocking range bounded by said minimum limit value and a second critical value of said minimum critical angle, said second critical value associated with a second expected value of said first angular variable, said second expected value of said first angular variable corresponding to said relative angular position of said sun at a second arbitrary time of day on said first arbitrary day of year; and b) storing and recalling said second digital value from said storage means;

and wherein said defining step includes the step of interpolating between said first reference value and said second reference value to obtain said desired value, said desired value associated with said current time of day on said current day of year.

7. A method of operating a venetian blind to regulate illumination admitted through a window, wherein:

a) said venetian blind has a plurality of louvers, each of said plurality of louvers rotatable in a plane perpendicular to said window, said plurality of louvers having a common tilt angle, said tilt angle corresponding to rotational displacement of said louvers in said plane with respect to a reference orientation, said tilt angle variable over an operating range, said operating range bounded by a minimum limit value and a maximum limit value;

b) said window has a geographic location, an orientation, and an outside surface receiving an incident illumination, said incident illumination including a direct component;

e) said direct component is produced by a sun, said sun having a relative angular position with respect to said window, said relative angular position uniquely defined by a first angular variable and a second angular variable, said first angular variable defining said angular position of said sun in said plane, said first angular variable and said second angular variable varying with time of day and day of year, said first angular variable and said second angular variable further varying with said geographic location and said orientation of said window; and d) said direct component passes through said venetian blind for a critical range of values of said tilt angle, said direct component being blocked for values of said tilt angle outside said critical range, said critical range contained within said operating range, said critical range bounded by a minimum critical angle and a maximum critical angle, said minimum critical angle and said maximum critical angle varying with said first angular variable;

said method including the steps of:

e) providing storage means for storing and recalling information;

f) providing time-registering means for registering a current time of day and a current day of year;

g) estimating a first reference value of said minimum critical angle, said first reference value associated with a first expected value of said first angular variable, said first expected value of said first angular variable corresponding to said relative angular position of said sun at a first arbitrary time of day on a first arbitrary day of year, said estimating step performed prior to said first arbitrary time of day on said first arbitrary day of year;

h) storing said first reference value in said storage means, said storing step performed prior to said first arbitrary time of day on said first arbitrary day of year;

i) recalling said first reference value from said storage means;

j) establishing a current critical value of said minimum critical angle as a first predetermined function of a first plurality of quantities, said first plurality of quantities including:
i) said first reference value,
ii) said first arbitrary time of day and said first arbitrary day of year, and
iii) said current time of day and said current day of year; and k) selecting a desired value of said tilt angle from a blocking range of values, said blocking range bounded by said minimum limit value and said current critical value; and l) adjusting said tilt angle of said plurality of louvers to said desired value.

8. The method of claim 7, wherein:

a) said incident illumination has a brightness;

b) said method includes the step of providing measuring means to measure said brightness, said measuring means producing a current brightness value; and c) said selecting step includes the step of evaluating a second predetermined function of said current brightness value, said desired value of said tilt angle thereby varying with said current brightness value but constrained within said blocking range.

9. The method of claim 7, wherein said establishing step includes the step of equating said current critical value of said minimum critical angle to said first reference value, said equating step performed under a predetermined set of conditions, said predetermined set of conditions including:

a) a first condition under which a first absolute value of a first difference between said current time of day and said first arbitrary time of day is less than a first predetermined threshold; and b) a second condition under which a second absolute value of a second difference between said current day of year and said first arbitrary day of year is less than a second predetermined threshold.

10. The method of claim 7, wherein said method further includes the steps of:

a) estimating a second reference value of said minimum critical angle, said second reference value associated with a second expected value of said first angular variable, said second expected value of said first angular variable corresponding to said relative angular position of said sun at a second arbitrary time of day on said first arbitrary day of year; and b) storing and recalling said second reference value from said storage means;

and wherein said establishing step includes the step of interpolating between said first reference value and said second reference value to obtain said current critical value, said current critical value associated with said current time of day on said current day of year.

11. A method of operating a venetian blind to regulate illumination admitted through a window, wherein:

a) said venetian blind has a plurality of louvers, each of said plurality of louvers rotatable in a plane perpendicular to said window, said plurality of louvers having a common tilt angle, said tilt angle corresponding to rotational displacement of said louvers in said plane with respect to a reference orientation, said tilt angle variable over an operating range, said operating range bounded by a minimum limit value and a maximum limit value;

b) said window has a geographic location, an orientation, and an outside surface receiving an incident illumination, said incident illumination including a direct component;

c) said direct component is produced by a sun, said sun having a relative angular position with respect to said window, said relative angular position uniquely defined by a first angular variable and a second angular variable, said first angular variable defining said angular position of said sun in said plane, said first angular variable and said second angular variable varying with time of day and day of year, said first angular variable and said second angular variable further varying with said geographic location and said orientation of said window; and d) said direct component passes through said venetian blind for a critical range of values of said tilt angle, said direct component being blocked for values of said tilt angle outside said critical range, said critical range contained within said operating range, said critical range bounded by a minimum critical angle and a maximum critical angle, said minimum critical angle and said maximum critical angle varying with said first angular variable;

said method including the steps of:

e) providing storage means for storing and recalling information;

f) providing time-registering means for registering a current time of day and a current day of year;

g) predicting a first reference value of said first angular variable, said first reference value of said first angular variable corresponding to said relative angular position of said sun at a first arbitrary time of day on a first arbitrary day of year, said predicting step performed prior to said first arbitrary time of day on said first arbitrary day of year;

h) storing said first reference value in said storage means, said storing step performed prior to said first arbitrary time of day on said first arbitrary day of year;

i) recalling said first reference value from said storage means;

j) establishing a current value of said first angular variable as a first predetermined function of a first plurality of quantities, said first plurality of quantities including:
  i) said first reference value of said first angular variable,
  ii) said first arbitrary time of day and said first arbitrary day of year, and
  iii) said current time of day and said current day of year; and k) selecting a desired value of said tilt angle from a blocking range of values of said tilt angle, said blocking range bounded by said minimum limit value and a critical value of said minimum critical angle, said critical value associated With said current value of said first angular variable; and l) adjusting said tilt angle of said plurality of louvers to said desired value.

12. The method of claim 11, wherein:
a) said incident illumination has a brightness;
b) said method includes the step of providing measuring means to measure said brightness, said measuring means producing a current brightness value; and
c) said selecting step includes the step of evaluating a second predetermined function of said current brightness value, said desired value of said tilt angle thereby varying with said current brightness value but constrained within said blocking range.

13. The method of claim 11, wherein said establishing step includes the step of equating said current value of said first angular variable to said first reference value, said equating step performed under a predetermined set of conditions, said predetermined set of conditions including:
  a) a first condition under which a first absolute value of a first difference between said current time of day and said first arbitrary time of day is less than a first predetermined threshold; and
  b) a second condition under which a second absolute value of a second difference between said current day of year and said first arbitrary day of year is less than a second predetermined threshold.

14. The method of claim 11, wherein said method further includes the steps of:
  a) predicting a second reference value of said first angular variable, said second reference value of said first angular variable corresponding to said relative angular position of said sun at a second arbitrary time of day on said first arbitrary day of year; and
  b) storing and recalling said second reference value from said storage means;

and wherein said establishing step includes the step of interpolating between said first reference value and said second reference value to obtain said current value of said first angular variable, said current value associated with said current time of day on said current day of year.

15. A method of regulating illumination admitted through a window, said window having a certain geographic location, a certain orientation, and an outside surface receiving an incident illumination, said incident illumination having a brightness, said incident illumination produced by a sun, said sun having a relative angular position with respect to said window, said relative angular position varying with time of day and day of year, said relative angular position further dependent on said certain geographic location and said certain orientation of said window, said relative angular position uniquely defined by a first angular variable and a second angular variable, said method including the steps of:

a) providing a window covering having an adjustable setting;

b) measuring said brightness of said incident illumination, said measuring step producing a current brightness value;

c) inferring an absence of a direct component of said incident illumination, said inferring step including the steps of:
  i) inferring an expected value of said first angular variable, said expected value corresponding to said relative angular position of said sun at a certain time of day on a certain day of year;
  ii) comparing said expected value to a predetermined threshold, said comparing step producing a result; and
  iii) declaring said absence if said result has a predetermined value;

d) estimating a desired setting of said window covering, said desired setting dependent on said current brightness value and said inferred absence of said direct component; and e) adjusting said window covering to said desired setting.

* * * * *